(12) United States Patent
Hou et al.

(10) Patent No.: US 9,148,264 B2
(45) Date of Patent: Sep. 29, 2015

(54) DATA TRANSMISSION METHOD, DEVICE AND SYSTEM

(71) Applicant: Huawei Technologies Co., Ltd., Shenzhen (CN)

(72) Inventors: Xinyu Hou, Hangzhou (CN); Sheng Chang, Hangzhou (CN); Rongyu Yang, Hangzhou (CN); Guang Lu, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/502,326

(22) Filed: Sep. 30, 2014

(65) Prior Publication Data

US 2015/0026527 A1    Jan. 22, 2015

Related U.S. Application Data

(63) Continuation of application No. PCT/CN2012/083180, filed on Oct. 19, 2012.

(30) Foreign Application Priority Data

Apr. 11, 2012  (CN) .......................... 2012 1 0104821

(51) Int. Cl.
*H04L 1/24* (2006.01)
*H04L 1/18* (2006.01)
(Continued)

(52) U.S. Cl.
CPC ................ *H04L 1/24* (2013.01); *G06F 11/076* (2013.01); *G06F 11/263* (2013.01); *H04L 1/08* (2013.01); *H04L 1/18* (2013.01); *H04L 1/1825* (2013.01); *H04L 1/20* (2013.01)

(58) Field of Classification Search
CPC ............ H04L 1/24; H04L 1/20; H04L 1/1825
See application file for complete search history.

(56) References Cited

U.S. PATENT DOCUMENTS 4,730,313 A  *  3/1988  Stephenson et al. .......... 714/708
5,467,341 A  *  11/1995  Matsukane et al. ........... 370/253
(Continued)

FOREIGN PATENT DOCUMENTS

CN          1422032 A        6/2003
CN          1441577 A        9/2003
(Continued)

OTHER PUBLICATIONS

Partial English Translation and Abstract of Chinese Patent Application No. CN1441577A, Dec. 19, 2014, 6 pages.
(Continued)

*Primary Examiner* — Joseph D Torres
(74) *Attorney, Agent, or Firm* — Conley Rose, P.C.; Grant Rodolph

(57) ABSTRACT

A data transmission method, device and system to improve reliability of a data link. When the sender side detects erroneous data, the erroneous data is discarded and a data retransmission request is sent to the sender side to ensure correctness of received data and improve reliability of the data link; and, when the sender side detects the erroneous data and a bit error rate is greater than a preset bit error rate threshold, the data link gets into auto recovery, and data transmission is resumed after the recovery succeeds, thereby avoiding an excessively high bit error rate, preventing an excessively high probability of omitted checks (the higher the bit error rate is, the higher probability of omitted checks is), and further improving reliability of the data link.

18 Claims, 13 Drawing Sheets

(51) Int. Cl.
  *H04L 1/20* (2006.01)
  *G06F 11/07* (2006.01)
  *G06F 11/263* (2006.01)
  *H04L 1/08* (2006.01)

(56) References Cited

U.S. PATENT DOCUMENTS

| | | | | |
|---|---|---|---|---|
| 5,740,167 | A * | 4/1998 | Taketsugu et al. | 370/337 |
| 6,646,987 | B1 | 11/2003 | Qaddoura | |
| 2007/0064733 | A1* | 3/2007 | Osawa et al. | 370/468 |
| 2008/0171543 | A1* | 7/2008 | Tran et al. | 455/424 |
| 2009/0010643 | A1* | 1/2009 | DeLew et al. | 398/17 |
| 2010/0039977 | A1* | 2/2010 | Hikari et al. | 370/312 |
| 2010/0281327 | A1* | 11/2010 | Okamura | 714/751 |

FOREIGN PATENT DOCUMENTS

| | | |
|---|---|---|
| CN | 101656603 A | 2/2010 |
| CN | 102629898 A | 8/2012 |

OTHER PUBLICATIONS

Partial English Translation and Abstract of Chinese Patent Application No. CN101656603A, Dec. 19, 2014, 9 pages.

Partial English Translation and Abstract of Chinese Patent Application No. CN102629898A, Dec. 27, 2014, 10 pages.

Foreign Communication From a Counterpart Application, PCT Application No. PCT/CN2012/083180, English Translation of International Search Report dated Jan. 31, 2013, 3 pages.

Foreign Communication From a Counterpart Application, PCT Application No. PCT/CN2012/083180, English Translation of Written Opinion dated Jan. 31, 2013, 13 pages.

* cited by examiner

DATA TRANSMISSION METHOD, DEVICE AND SYSTEM

CROSS-REFERENCE TO RELATED APPLICATIONS

This application is a continuation of International Application No. PCT/CN2012/083180, filed on Oct. 19, 2012, which claims priority to Chinese Patent Application No. 201210104821.0, filed on Apr. 11, 2012, both of which are hereby incorporated by reference in their entireties.

TECHNICAL FIELD

The present invention relates to the field of data transmission technologies, and in particular, to a data transmission method, device and system.

BACKGROUND

In an electronic system, data transmission is often performed between two chips under control of an upper layer control system over a data link (a chip that sends data is a sender side, and a chip that receives the data is a receiver side). A higher data transmission speed has higher requirements on reliability of the data link. How to improve reliability of the data link becomes a target of research.

SUMMARY

In view of the foregoing facts, embodiments of the present invention aim to provide a data transmission method, device and system to improve reliability of a data link.

To fulfill the aim, the embodiments of the present invention provide the following technical solutions.

According to one aspect of the embodiments of the present invention, a data transmission method is provided, where the method is used to exchange data with a sender side, and the method includes:

S1: Receive data sent by the sender side, where the data includes retransmitted data or non-retransmitted data that is inclusive of a check bit;

S2: Check the received data to determine whether erroneous data is detected, and, if erroneous data is detected, proceed to step S3, or, if erroneous data is not detected, return to step S1;

S3: Discard the erroneous data and subsequently received non-retransmitted data, send a data retransmission request to the sender side, and count an bit error rate;

S4: Determine whether the bit error rate meets a first preset condition, and, if the bit error rate meets the first preset condition, proceed to step S1, or, if the bit error rate does not meet the first preset condition, proceed to step S5, where the first preset condition is that the bit error rate is less than a preset bit error rate threshold; and S5: Collaborate with the sender side to perform link auto-recovery by transmitting a test code stream based on different compensation parameter combinations, and, if the link auto-recovery succeeds, return to step S1, or, if the link auto-recovery fails, exit, where the compensation parameter combinations include a receiver-side compensation parameter and a sender-side accentuation parameter; and the link auto-recovery success is determined according to existence of a compensation parameter combination in which an bit error rate of transmitting the test code stream meets the first preset condition, and the link auto-recovery failure is determined according to no existence of the compensation parameter combination in which the bit error rate of transmitting the test code stream meets the first preset condition.

According to another aspect of the embodiments of the present invention, a data transmission method is provided, where the method is used to exchange data with a receiver side, and the method includes performing a first sending operation; and when receiving a data sending stop notification from an upper layer control system and/or a sender side, collaborating with the receiver side to perform link auto-recovery by transmitting a test code stream based on different compensation parameter combinations, and, if the link auto-recovery succeeds, continuing performing the first sending operation, or, if the link auto-recovery fails, exiting, where the compensation parameter combinations include a receiver-side compensation parameter and a sender-side accentuation parameter; the first sending operation includes sending non-retransmitted data that is inclusive of a check bit to the receiver side when no data retransmission request is received, and sending retransmitted data when the data retransmission request is received and no data sending stop notification is received from the upper layer control system and/or the sender side, where the data retransmission request is sent by the receiver side when receiving of erroneous data is detected, the notification is sent when the receiver side detects the receiving of the erroneous data and determines that an bit error rate does not meet a first preset condition, the bit error rate is counted when the receiver side detects the receiving of the erroneous data and discards the erroneous data and subsequently received non-retransmitted data, and the first preset condition is that the bit error rate is less than a preset bit error rate threshold; and the link auto-recovery success is determined according to existence of a compensation parameter combination in which an bit error rate of transmitting the test code stream meets the first preset condition, and the link auto-recovery failure is determined according to no existence of the compensation parameter combination in which the bit error rate of transmitting the test code stream meets the first preset condition.

According to still another aspect of the embodiments of the present invention, a data transmission device is provided, where the data transmission device is used to exchange data with a sender side, and the data transmission device includes a first receiving unit, a checking unit, a data retransmission request unit, a first auto-recovery unit, and a first main control unit; the first main control unit is configured to instruct the first receiving unit to perform a first receiving operation, where the first receiving operation includes receiving data sent by the sender side, where the data includes retransmitted data or non-retransmitted data that is inclusive of a check bit; instruct the checking unit to check the received data; when the checking unit does not detect erroneous data, instruct the first receiving unit to continue performing the first receiving operation; or, when the checking unit detects erroneous data instruct the data retransmission request unit to discard the erroneous data and subsequently received non-retransmitted data, send a data retransmission request to the sender side, and count an bit error rate; determine whether the bit error rate meets a first preset condition, and, if the bit error rate meets the first preset condition, instruct the first receiving unit to continue performing the first receiving operation, or, if the bit error rate does not meet the first preset condition, instruct the first auto-recovery unit to collaborate with the sender side to perform link auto-recovery by transmitting a test code stream based on different compensation parameter combinations, where the first preset condition is that the bit error rate is less than a preset bit error rate threshold, and the compensation parameter combinations include a receiver-side compensation parameter and a sender-side accentuation parameter; and when the link auto-recovery succeeds, instruct the first receiving unit to continue performing the first receiving operation, or, when the link auto-recovery fails, instruct all units to exit, where the link auto-recovery success is determined according to existence of a compensation parameter combination in which an bit error rate of transmitting the test code stream meets the first preset condition, and the link auto-recovery failure is determined according to no existence of the compensation parameter combination in which the bit error rate of transmitting the test code stream meets the first preset condition.

According to still another aspect of the embodiments of the present invention, a data transmission device is provided, where the data transmission device is used to exchange data with a receiver side, and the data transmission device includes a first sending unit, a second auto-recovery unit, and a second main control unit; the second main control unit is configured to instruct the first sending unit to perform a first sending operation; when receiving a data sending stop notification from an upper layer control system and/or a sender side, instruct the second auto-recovery unit to collaborate with the receiver side to perform link auto-recovery by transmitting a test code stream based on different compensation parameter combinations, where the compensation parameter combinations include a receiver-side compensation parameter and a sender-side accentuation parameter; and when the link auto-recovery succeeds, instruct the first sending unit to continue performing the first sending operation, or, when the link auto-recovery fails, instruct all units to exit, where the first sending operation includes sending non-retransmitted data that is inclusive of a check bit to the receiver side when no data retransmission request is received, and sending retransmitted data when the data retransmission request is received and no data sending stop notification is received from the upper layer control system and/or the sender side, where the data retransmission request is sent by the receiver side when receiving of erroneous data is detected, the notification is sent when the receiver side detects the receiving of the erroneous data and determines that an bit error rate does not meet a first preset condition, the bit error rate is counted when the receiver side detects the receiving of the erroneous data and discards the erroneous data and subsequently received non-retransmitted data, and the first preset condition is that the bit error rate is less than a preset bit error rate threshold; and the link auto-recovery success is determined according to existence of a compensation parameter combination in which an bit error rate of transmitting the test code stream meets the first preset condition, and the link auto-recovery failure is determined according to no existence of the compensation parameter combination in which the bit error rate of transmitting the test code stream meets the first preset condition.

According to still another aspect of the embodiments of the present invention, a data transmission device is provided, where the data transmission device includes a sender-side module and a receiver-side module, the sender-side module includes at least a first sending unit, a second auto-recovery unit, and a second main control unit that are described above, and the receiver-side module includes at least a first receiving unit, a checking unit, a data retransmission request unit, a first auto-recovery unit, and a first main control unit that are described above.

According to still another aspect of the embodiments of the present invention, a data transmission system is provided, where the data transmission system includes a sender-side data transmission device and a receiver-side data transmission device, the sender-side data transmission device includes at least a first sending unit, a second auto-recovery unit, and a second main control unit that are described above, and the receiver-side data transmission device includes at least a first receiving unit, a checking unit, a data retransmission request unit, a first auto-recovery unit, and a first main control unit that are described above.

According to still another aspect of the embodiments of the present invention, a data transmission system is provided, where the data transmission system includes at least one data transmission device equipped with a sender-side module and a receiver-side module that are described above.

Therefore, in the embodiments of the present invention, in one aspect, when the sender side detects erroneous data, the erroneous data is discarded and a data retransmission request is sent to the sender side to ensure correctness of the received data and improve reliability of the data link; and, in another aspect, when the bit error rate is greater than the preset bit error rate threshold, the data link gets into auto recovery, and data transmission is resumed after the recovery succeeds, thereby avoiding an excessively high bit error rate, preventing an excessively high probability of omitted checks (the higher the bit error rate is, the higher probability of omitted checks is), and further improving reliability of the data link.

BRIEF DESCRIPTION OF DRAWING(S)

To describe the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

DESCRIPTION OF EMBODIMENTS

For purposes of citation and clarity, technical terms, abbreviations or acronyms used hereinafter are explained below in summary:

cache stands for high-speed cache memory;
CRC stands for Cyclic Redundancy Check;
PRBS stands for Pseudo-Random Binary Sequence; and
EQ stands for equation.

The following clearly describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

In an electronic system, data transmission is performed between two chips under control of an upper layer control system over a data link (a chip that sends data is a sender side, and a chip that receives the data is a receiver side). A higher data transmission speed has higher requirements on reliability of the data link. How to improve reliability of the data link becomes a target of research.

In view of the foregoing facts, the embodiments of the present invention disclose the following data transmission method to improve the reliability of the data link.

The transmission method is used to exchange data between a receiver side and a sender side or even an upper layer control system. The following description is given from a perspective of the receiver side.

Figure 1:
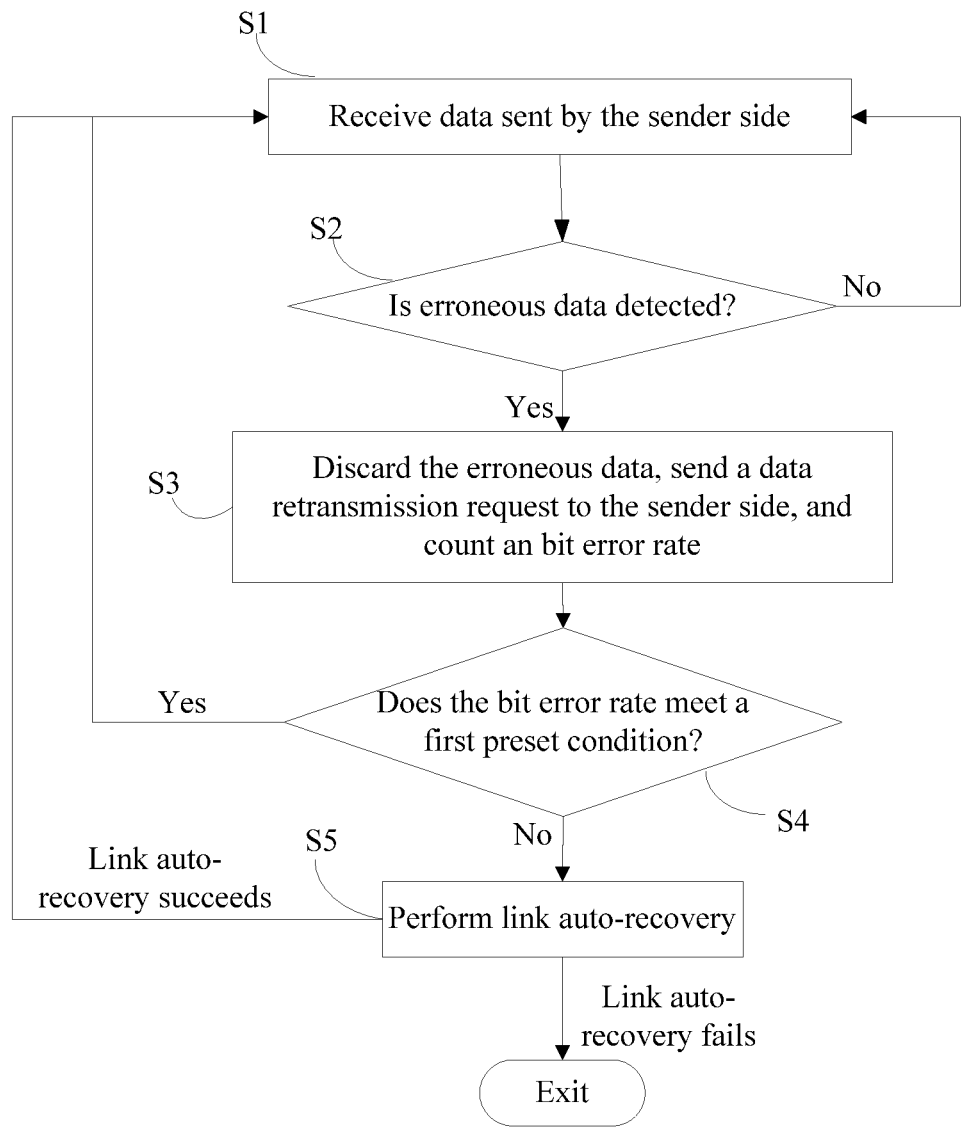
FIG. 1 is a flowchart of a data transmission method based on a receiver side according to an embodiment of the present invention.

As shown in FIG. 1, the method includes at least the following steps:

S1: Receive data sent by the sender side, where the data includes retransmitted data or non-retransmitted data that is inclusive of a check bit.

The check bit may be a CRC check bit or another check bit. A person skilled in the art may flexibly select a check manner according to reliability requirements. A scenario with higher reliability requirements uses a check manner with a higher capability, the details of which are not given here any further.

S2: Check the received data to determine whether erroneous data is detected, and, if erroneous data is detected, proceed to step S3, or, if erroneous data is not detected, return to step S1.

It should be noted that the receiver side needs to use a same check manner as that on the sender side to check the received data.

S3: Discard the erroneous data and subsequently received non-retransmitted data, send a data retransmission request to the sender side, and count a bit error rate.

After step S3 is performed, the operation performed on the sender side is sending retransmitted data to the receiver side when receiving the data retransmission request from the receiver side.

S4: Determine whether the bit error rate counted in step S3 meets a first preset condition. If the bit error rate meets the first preset condition, proceed to step S1, or, if the bit error rate does not meet the first preset condition, proceed to step S5.

The first preset condition is that the bit error rate is less than a preset bit error rate threshold.

Because different application scenarios may have different data transmission reliability requirements, the requirement on the bit error rate also differs. Some application scenarios have a high bit error rate requirement that the bit error rate be $10^{-14}$ or even $10^{-15}$ while other application scenarios have a bit error rate requirement that the bit error rate be $10^{-12}$. Therefore, a person skilled in the art may flexibly set the bit error rate threshold according to actual application scenarios, which is not described here exhaustively.

S5: Collaborate with the sender side to perform link auto-recovery by transmitting a test code stream based on different compensation parameter combinations. When a compensation parameter combination in which an bit error rate of transmitting the test code stream meets the first preset condition exists, determine that the link auto-recovery succeeds, and return to step S1; when the compensation parameter combination in which the bit error rate of transmitting the test code stream meets the first preset condition does not exist, determine that the link auto-recovery fails, and exit.

The compensation parameter combinations may include a receiver-side compensation parameter and a sender-side accentuation parameter. More specifically, the receiver-side compensation parameter may be a "receiver-side EQ parameter", and the sender-side accentuation parameter may be a "sender-side EQ parameter".

The receiver side may use different EQ parameters to receive data. Likewise, the sender side may use different EQ parameters to send data. If the receiver side can use 5 different types of EQ parameters to receive data and the sender side can use 7 different types of EQ parameters to send data, there are 5*7=35 types of EQ parameter combinations (compensation parameter combinations).

It should be noted that step S5 may be directly performed by the receiver side, or performed as instructed by the upper layer control system, which will be detailed below. In addition, when the link auto-recovery fails, the receiver side or the upper layer control system indicates the link auto-recovery failure to the sender side, so that the sender side performs subsequent operations.

In practice, more than one data link may exist between the sender side and the receiver side. When multiple data links exist, if auto-recovery of a certain data link fails, the sender side and the receiver side may switch to another normally communicating link to continue data transmission according to mutual negotiation or an instruction from the upper layer control system. Therefore, in other embodiments of the present invention, after the exit, the method disclosed in all the foregoing embodiments may further include (receiving an instruction from the upper layer control system) switching to another normally communicating data link, whereupon the procedure continues from step S1 onwards on the normally communicating data link.

Therefore, in this embodiment of the present invention, in one aspect, when the sender side detects erroneous data, the erroneous data is discarded and the data retransmission request is sent to the sender side to ensure correctness of the received data and improve reliability of the data link; and, in another aspect, when the bit error rate is greater than the preset bit error rate threshold, the data link gets into auto recovery, and data transmission is resumed after the recovery succeeds, thereby avoiding an excessively high bit error rate, preventing an excessively high probability of omitted checks (the higher the bit error rate is, the higher probability of omitted checks is), and further improving reliability of the data link.

Figure 2:
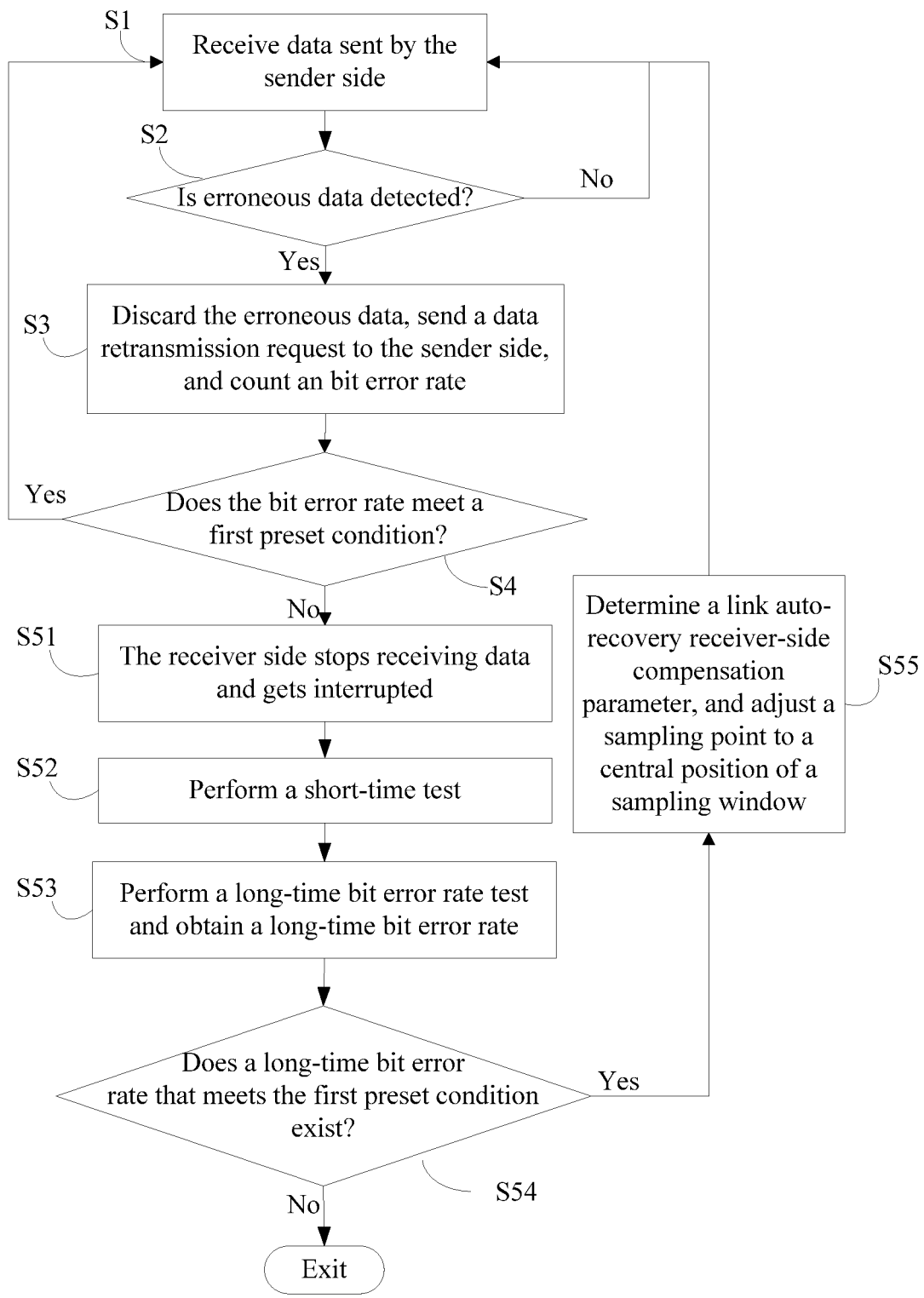
FIG. 2 is another flowchart of a data transmission method based on a receiver side according to an embodiment of the present invention.

In other embodiments of the present invention, as shown in FIG. 2, the step S5 may include the following:

S51: The receiver side stops receiving data and gets interrupted, so that an upper layer control system responds to the interruption.

Figure 3:
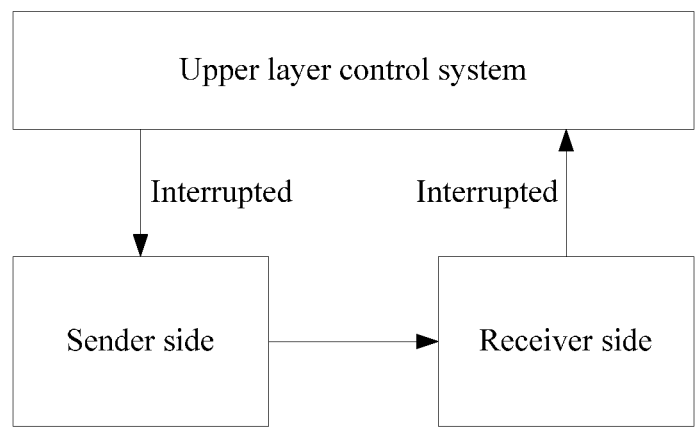
FIG. 3 is an interruption flowchart according to an embodiment of the present invention.

Further, after the receiver side gets interrupted, the upper layer control system responds to the interruption and determines that data transmission needs to be stopped due to a data link exception. Subsequently, by means of interruption, the upper layer control system instructs the sender side of a link to stop sending the data. In this way, the sender side of the data link also stops sending the data. An interruption process is shown in FIG. 3.

After interrupting the data transmission on the sender side, the upper layer control system may further raise an alarm to the sender side.

Alternatively, by raising the alarm to the sender side, the upper layer control system may instruct the sender side of the link to stop sending the data. In addition, in other embodiments, the receiver side may instruct the sender side to stop sending data by directly sending a preset packet or instruction to the sender side. Certainly, the receiver side may directly send the preset packet (or instruction) to the sender side at the same time when the upper layer control system uses the interruption (or the alarm) to instruct the sender side to stop sending the data.

S52: Perform a short-time test for at least one time.

Duration of the short-time test is measured in seconds. The short-time test includes receiving the test code stream (such as a PRBS23 code stream) based on a receiver-side compensation parameter and scanning a sampling window width, where the test code stream is sent by the sender side based on a sender-side accentuation parameter, and the short-time test performed each time is based on a different combination of the receiver-side compensation parameter and the sender-side accentuation parameter.

It is still assumed that there are 35 types of EQ parameter combinations. Because the short-time test performed each time corresponds to a type of EQ parameter combination, the short-time test may be performed for 35 times correspondingly. If there are many EQ parameter combinations, a part of the EQ parameter combinations may be selected to perform the short-time test according to test data in a development stage.

In a certain short-time test, an EQ parameter combination used by the sender side and the receiver side may be allocated by the upper layer control system. That is, the upper-layer control system allocates sender-side EQ parameters and receiver-side EQ parameters to the sender side and the receiver side respectively. Certainly, because the number of EQ parameter combinations is finite, the parameters may be preset on the sender side and the receiver side separately, and a specific regular pattern of employing the EQ parameters on the sender side and the receiver side is preset separately. In this way, when performing the link auto-recovery, the sender side and the receiver side can directly reuse the preset regular pattern of employing the EQ parameters.

The operation of scanning the sampling window width may include the following steps:

Step 1: Perform an error check on each sampling point.

Further, stay at each sampling point for 2 seconds, where 0-1 second is a transition period, after which a steady state is deemed to begin and timing begins, and count the number of errors in the test code stream received within the 1 second (s) of timing.

Subsequently, jump to another sampling point to repeat the foregoing operations.

Step 2: Use the number of continuous sampling points with zero errors as the sampling window width.

For example, it is assumed that in one short-time test, an error check is performed on 128 sampling points, and it is known that the $50^{th}$-$61^{st}$ sampling points do not have errors (that is, with zero errors), and therefore, the number of continuous sampling points with zero errors is 61−50+1=12, and therefore, 12 is used as the sampling window width.

S53: When a second preset condition is met, perform a long-time bit error rate test for at least one time and obtain a long-time bit error rate.

Duration of the long-time test is measured in hours.

The long-time bit error rate test performed each time includes receiving, by the receiver side, a test code stream based on the receiver-side compensation parameter corresponding to a short-time test in which a sampling window width value meets a third preset condition, where the test code stream is sent by the sender side based on the sender-side accentuation parameter corresponding to the same short-time test.

In some embodiments, the long-time bit error rate test may further include adjusting, by the receiver side, a sampling point to a central position of a sampling window, and receiving a test code stream based on the receiver-side compensation parameter corresponding to a short-time test in which a sampling window width value meets a third preset condition, where the test code stream is sent by the sender side based on the sender-side accentuation parameter corresponding to the same short-time test.

The 35 types of EQ parameter combinations are still used as an example. After the short-time test is performed for 35 times, the short-time test performed each time corresponds to a sampling window width, or in other words, each EQ parameter combination corresponds to a sampling window width. In this case, the EQ parameter combination in which a sampling window width value meets the third preset condition may be selected for performing the long-time test.

The third preset condition may be the sampling window width value is greater than a preset width value, or, after sampling window width values are sorted in descending order, all the first X (X is an integer that is not less than 1) sampling window width values are defined as values that meet the third preset condition.

Each EQ parameter combination that has a sampling window width value meeting the third preset condition corresponds to one long-time bit error rate test, and a long-time bit error rate is obtained when one long-time bit error rate test is performed. Therefore, the EQ parameter combination that has a sampling window width value meeting the third preset condition corresponds to a long-time bit error rate.

If multiple EQ parameter combinations that have a sampling window width values meeting the third preset condition exist, the long-time test is performed for multiple times. In a certain long-time test, an EQ parameter combination used by the sender side and the receiver side may be allocated by the upper layer control system, or the receiver side may make a decision and directly notify the sender side of an EQ parameter combination to be employed. For example, each of the 35 types of EQ parameter combinations (or the EQ parameter combinations that have a sampling window width value meeting the third preset condition) may be numbered, and the receiver side sends a sequence number to the sender side, and therefore, according to the received sequence number, the sender side can determine the EQ parameter combination whose sender-side EQ parameters will be used to perform the long-time test. Alternatively, the receiver side may send the sequence number to the upper layer control system, and the upper layer control system forwards the sequence number to the sender side.

S54: Determine whether a long-time bit error rate that meets the first preset condition exists, and, if the long-time bit error rate that meets the first preset condition exists, proceed to step S55, or, if the long-time bit error rate that meets the first preset condition does not exist, exit.

In other words, determine whether one or more long-time bit error rates in X long-time bit error rates corresponding to X long-time bit error rate tests meet the first preset condition, and, if one or more long-time bit error rates in the X long-time bit error rates corresponding to the X long-time bit error rate tests meet the first preset condition, proceed to step S55, or, if one or more long-time bit error rates in the X long-time bit error rates corresponding to the X long-time bit error rate tests do not meet the first preset condition, exit.

It should be noted that step S54 may be performed by the receiver side directly, or performed by the receiver side as instructed by the upper layer control system.

When the receiver side directly performs the step, the receiver side directly determines whether the long-time bit error rate that meets the first preset condition exists.

If the receiver side performs the step as instructed by the upper layer control system, the upper layer control system may determine whether the long-time bit error rate that meets the first preset condition exists, and send a determination result (yes or no) to the receiver side. According to the determination result, the receiver side can determine existence of the long-time bit error rate that meets the first preset condition or no existence of the long-time bit error rate that meets the first preset condition, and choose to proceed to step S55 or exit.

S55: Determine a link auto-recovery receiver-side compensation parameter, adjust a sampling point to a central position of a sampling window, and return to step S1.

The link auto-recovery receiver-side compensation parameter corresponds to a link auto-recovery sender-side accentuation parameter, and the link auto-recovery receiver-side compensation parameter and the link auto-recovery sender-side accentuation parameter are the receiver-side compensation parameter (EQ parameter) and the sender-side accentuation parameter (EQ parameter) used in the same long-time bit error rate test in which the long-time bit error rate meets the first preset condition.

In other words, the receiver-side EQ parameter and the sender-side EQ parameter in the EQ parameter combination that has a long-time bit error rate meeting the first preset condition are respectively used as the link auto-recovery receiver-side compensation parameter and the link auto-recovery sender-side accentuation parameter.

As mentioned above, the determining the link auto-recovery receiver-side compensation parameter may be performed by the receiver side independently, or performed by the receiver side as instructed by the upper layer control system.

In addition, it is possible that long-time bit error rates corresponding to multiple EQ parameter combinations meet the first preset condition. Therefore, in other embodiments of the present invention, when the long-time bit error rates corresponding to the multiple EQ parameter combinations meet the first preset condition, the receiver-side EQ parameter and the sender-side EQ parameter in an EQ parameter combination that has a maximum sampling window width value in a short-time test may be selected among the multiple EQ parameter combinations, and used as the link auto-recovery receiver-side compensation parameter and the link auto-recovery sender-side accentuation parameter.

It should be noted that, in a certain embodiment, the second preset condition in step S53 may be no condition (that is, S53 is performed directly and sequentially after S52 is performed), or may be a short-time bit error rate that meets the first preset condition exists in short-time bit error rates corresponding to short-time tests in which the sampling window width value meets the third preset condition.

Figure 4A:
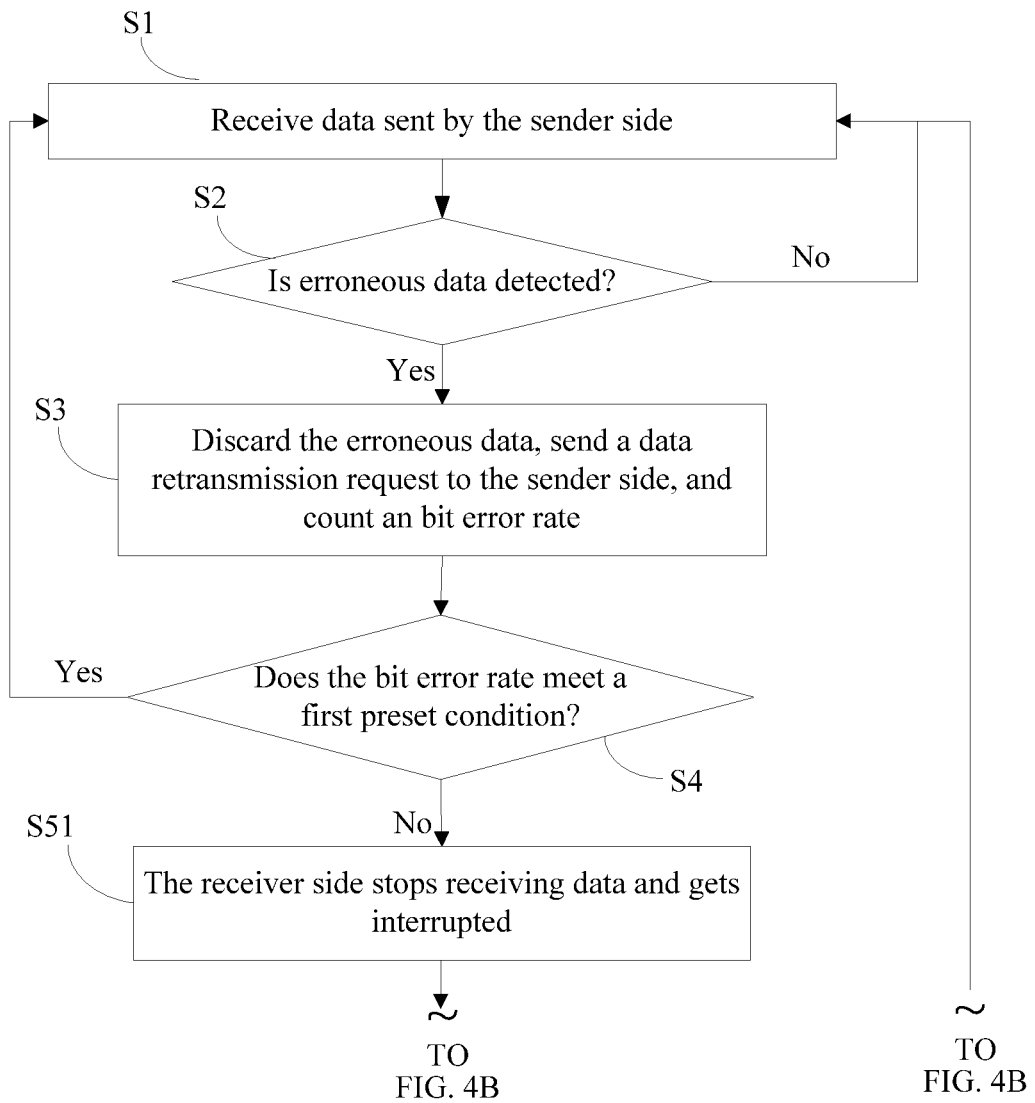
FIGS. 4A AND 4B are still other flowcharts of a data transmission method based on a receiver side according to an embodiment of the present invention.
Figure 4B:
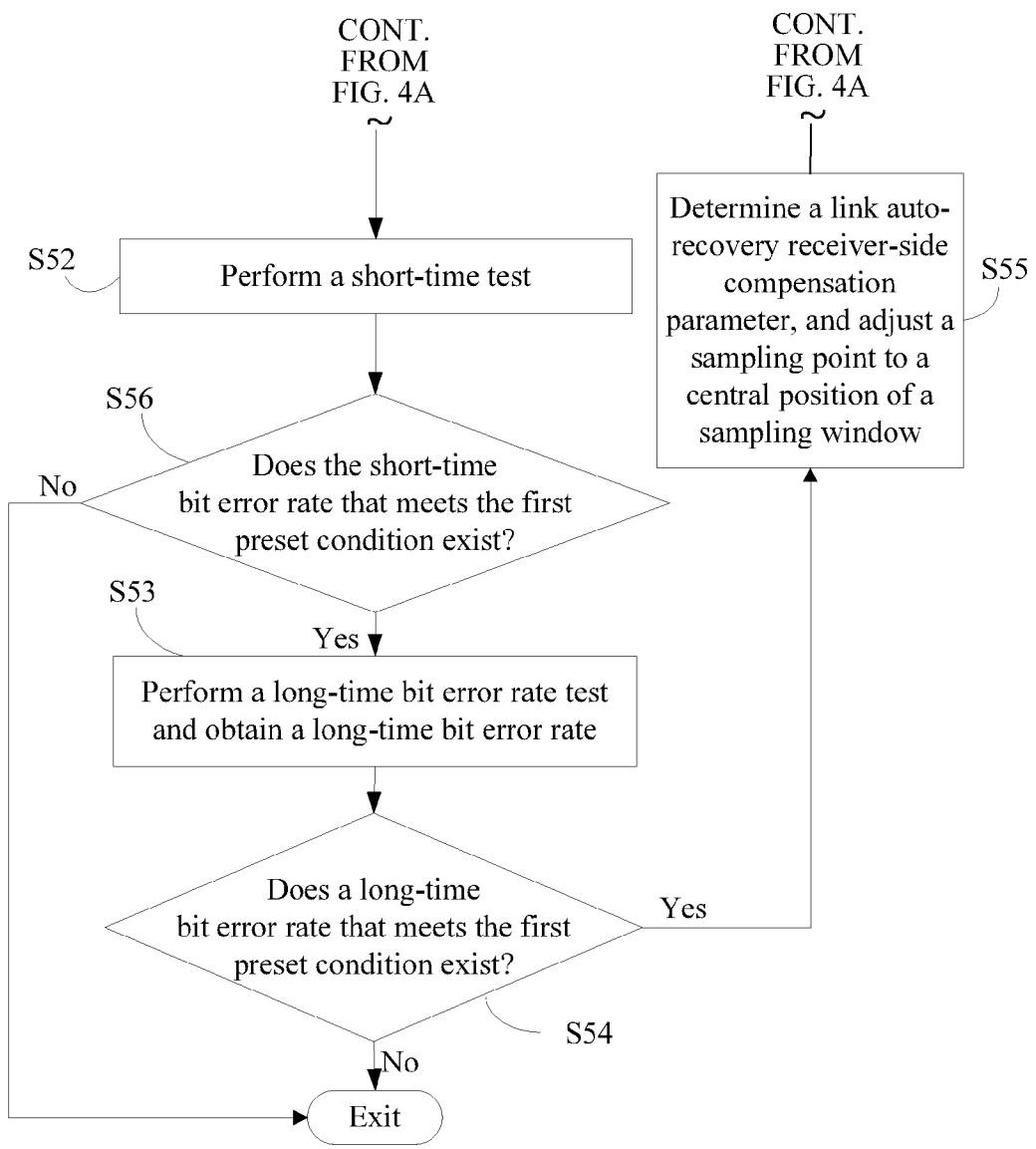

In a specific implementation, as shown in FIG. 4B, the following step is added between step S52 and step S53:

S56: Determine whether the short-time bit error rate that meets the first preset condition exists, and, if the short-time bit error rate that meets the first preset condition exists, proceed to step S53, or, if the short-time bit error rate that meets the first preset condition does not exist, exit.

That is, if no short-time bit error rate meets the first preset condition, it is determined that the link auto-recovery fails, and the long-time bit error rate test is skipped by directly exiting.

Figure 5:
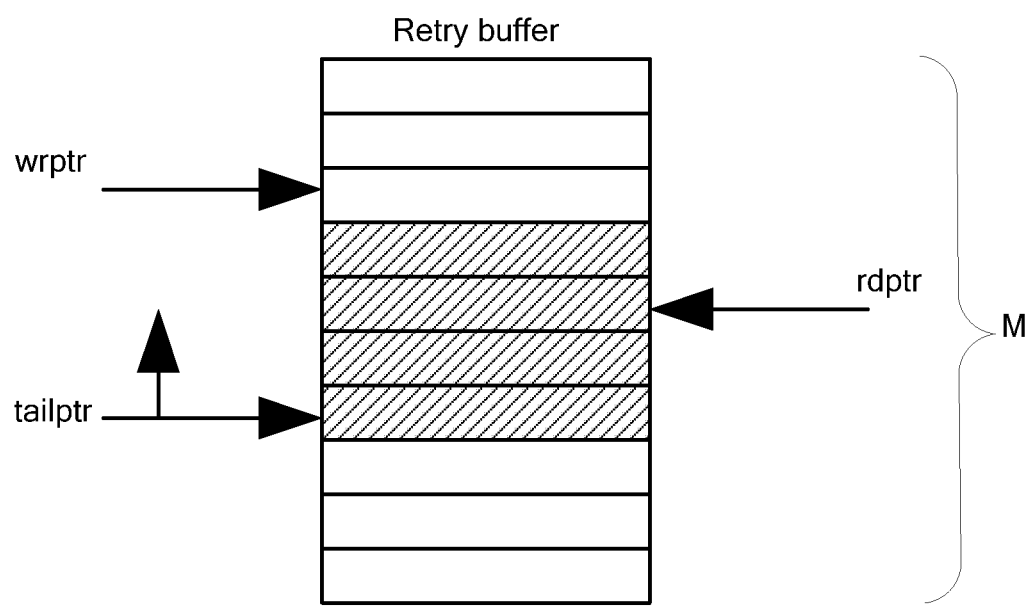
FIG. 5 is a schematic diagram of erroneous-data retransmission according to an embodiment of the present invention.

Erroneous data may be retransmitted in multiple manners, one of which is described below:

As shown in FIG. 5, a sender side needs to preset a retry buffer (retry buffer), so that data sent to a receiver side can be backed up into it, where the depth of the retry buffer is M. In addition, 4 counters need to be maintained on the sender side, a write pointer (wrptr) counter (a first counter), an read pointer (rdptr) counter (a second counter), a tailptr counter (a third counter), and a numfreebuf counter (a fourth counter). The wrptr is a write pointer of the retry buffer, the rdptr is a read pointer of the retry buffer, the tailptr is a data pointer that is sent earliest and not acknowledged by the receiver side, and the numfreebuf is the number of idle spaces in the retry buffer.

The receiver side needs to maintain 2 counters, an eseq counter (a fifth counter) and a Numack counter (a sixth counter). The eseq counts from 0 to M−1 cyclically and incrementally. The Numack counts from 0 to N cyclically and incrementally, where the N is a positive integer. In this embodiment, the N may be 7.

The following will describe usage of each counter in detail.

The wrptr counts from 0 to M−1 cyclically and incrementally. Whenever the sender side sends non-retransmitted data and writes the data as a backup into the retry buffer, the wrptr increases by 1; and, when the data is retransmitted, the wrptr remains unchanged.

Correspondingly, when data is received, the receiver side checks the received data. After a piece of errorless data is received, the Numack increases by 1. Whenever the Numack jumps from 7 to 0, it indicates that the receiver side has correctly received 8 pieces of data. In this case, the receiver side sends an acknowledgement (ACK) packet, notifying the sender side of the correct receiving of the 8 pieces of data.

Therefore, the sender side may release 8 spaces in the retry buffer according to the ACK packet received from the receiver side. The tailptr on the receiver side counts from 0 to M−1 cyclically and incrementally. After an ACK packet is received, the tailptr increases by 8. A distance between the wrptr and the tailptr is the number of pieces of data stored in the retry buffer.

As for the eseq, after a piece of errorless data is received, the eseq increases by 1; after a piece of erroneous data is received, the eseq does not increase. The receiver side sends the eseq as a parameter of a data retransmission request to the sender side, and discards subsequently received non-retransmitted data. After receiving the data retransmission request, the sender side uses the eseq in the request as the rdptr, and, from the retry buffer, reads the data that the rdptr points to, and re-sends the data as retransmitted data (the retransmitted data may be constructed as a packet that has a retransmission flag). After the retransmitted data is checked successfully, the eseq and the Numack increase by 1 separately, and then the receiver side normally receives subsequent non-retransmitted data.

The numfreebuf has an initial value of M−1, and counts from M−1 to 0 cyclically. After a piece of data is written into the retry buffer, the numfreebuf decreases by 1; after an ACK packet is received from the sender side, the numfreebuf increases by 8 (because 8 spaces have been released). The sender side can send data only when the numfreebuf is greater than 1 at least.

For ease of appellation, current count values of the wrptr counter, the rdptr counter, the tailptr counter, the numfreebuf counter, the eseq counter, and the Numack counter are denoted by wrptr, rdptr, tailptr, numfreebuf, eseq, and Numack respectively.

Figure 6:
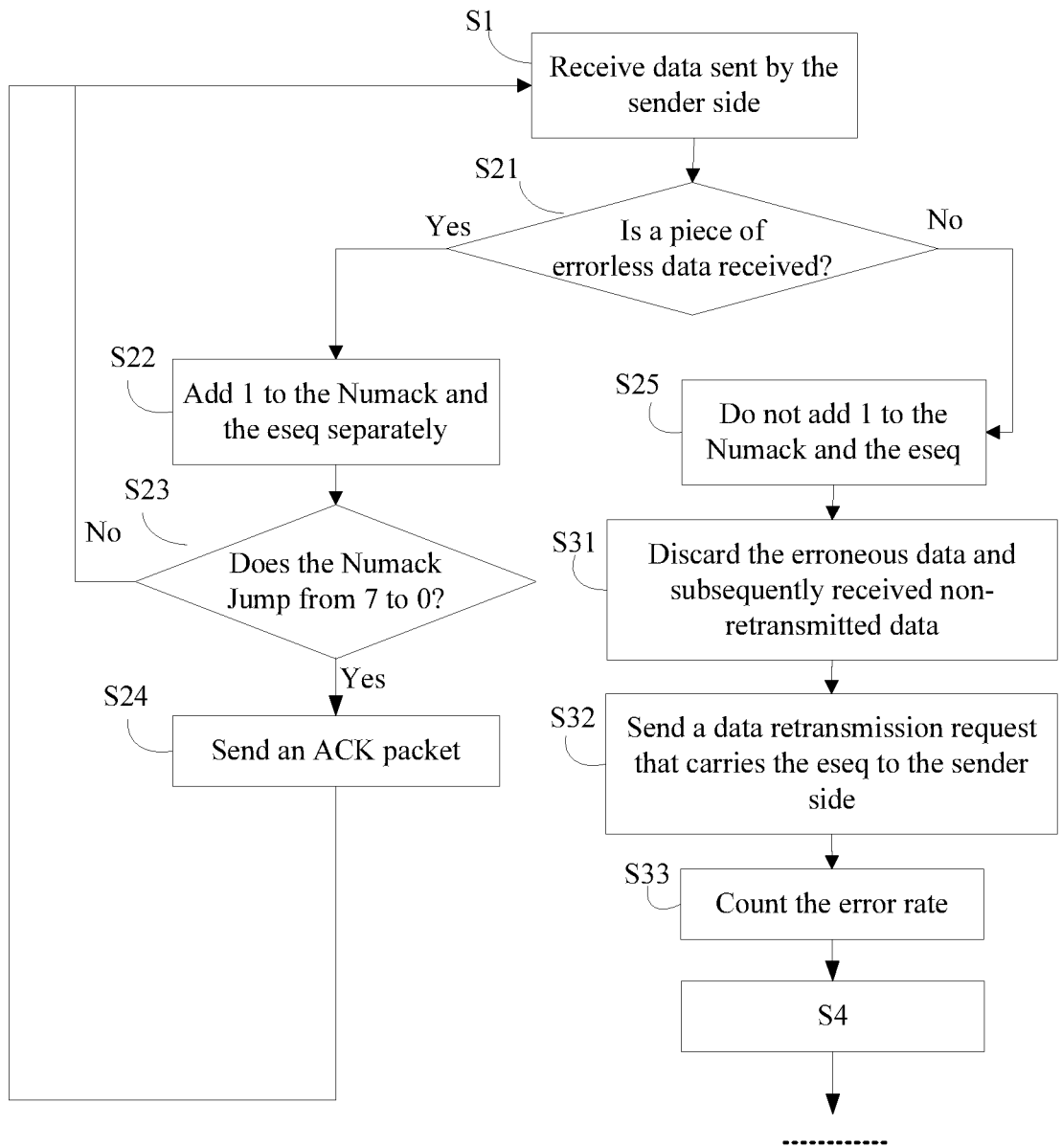
FIG. 6 is still another flowchart of a data transmission method based on a receiver side according to an embodiment of the present invention.

Based on each of the foregoing counters, as shown in FIG. 6, the step S2 may include the following steps:

S21: Check the received data successively to determine whether a piece of errorless data is received, and, if errorless data is received, proceed to step S22, or, if errorless data is not received, proceed to step S25.

S22: Add 1 to the Numack and the eseq separately.

S23: Determine whether the Numack jumps from 7 to 0, and, if the Numack jumps from N to 0 (indicating that the receiver side has correctly received 8 pieces of data), proceed to step S24, or, if the Numack does not jump from N to 0, proceed to step S1.

S24: Send an ACK packet to the sender side to notify the sender side that 8 pieces of data have been received correctly, so that the sender side can release 8 spaces in the retry buffer according to the received ACK packet, and then proceed to step S1.

S25: Proceed to step S3 without adding 1 to the Numack and the eseq.

Based on each of the foregoing counters, still as shown in FIG. 6, the step S3 may include the following steps:

S31: Discard the erroneous data and the subsequently received non-retransmitted data.

S32: Send a data retransmission request that carries the eseq to the sender side, so that the sender side extracts the eseq, uses the eseq as the rdptr, and sends, to the receiver side, the data that the rdptr points to as retransmitted data.

S33: Count the bit error rate, and proceed to step S4.

After the data transmission method based on the receiver side is described, the following text will give a description from a perspective of the sender side.

Figure 7:
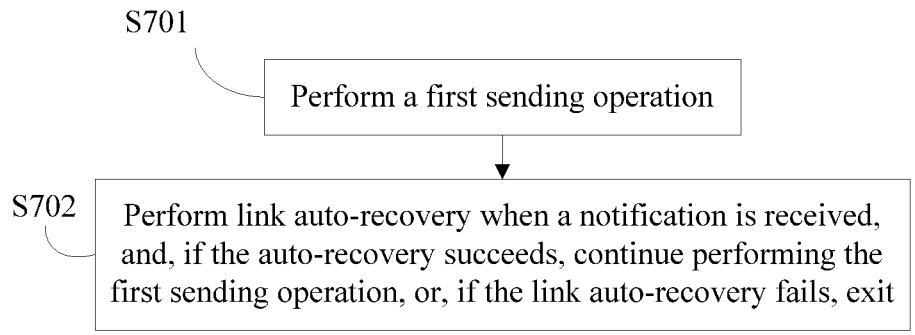
FIG. 7 is a flowchart of a data transmission method based on a sender side according to an embodiment of the present invention.

FIG. 7 shows a flowchart of the data transmission method based on the sender side. The method includes at least the following step S701: Perform a first sending operation.

S702: When receiving a data sending stop notification from an upper layer control system and/or the sender side, collaborate with the receiver side to perform link auto-recovery by transmitting a test code stream based on different compensation parameter combinations, and, if the link auto-recovery succeeds, continue performing the first sending operation, or, if the link auto-recovery fails, exit.

Further, the sender side receives an instruction from the receiver side or the upper layer control system, so as to know a success or a failure of the link auto-recovery. As regards how to determine the success or failure of the link auto-recovery, see the description given hereinabove, and no repeated description is given here any further.

The first sending operation includes sending non-retransmitted data that is inclusive of a check bit to the receiver side when no data retransmission request is received; and sending retransmitted data when the data retransmission request is received and no data sending stop notification is received from the upper layer control system and/or the sender side.

The data retransmission request is sent by the receiver side when receiving of erroneous data is detected, the notification is sent when the receiver side detects the receiving of the erroneous data and determines that a bit error rate does not meet a first preset condition, the bit error rate is counted when the receiver side detects the receiving of the erroneous data and discards the erroneous data and subsequently received non-retransmitted data, and the first preset condition is that the bit error rate is less than a preset bit error rate threshold.

In addition, according to the corresponding data transmission method described from the perspective of the receiver side above, the sender side stops sending data when receiving the notification. The upper layer control system may implement the notification by means of an interruption or an alarm. In addition, the receiver side may implement the notification by directly sending a preset packet or instruction to the sender side, or the receiver side may directly send a preset packet (or instruction) to the sender side at the same time when the upper layer control system uses the interruption (or the alarm) to implement the notification.

Figure 8:
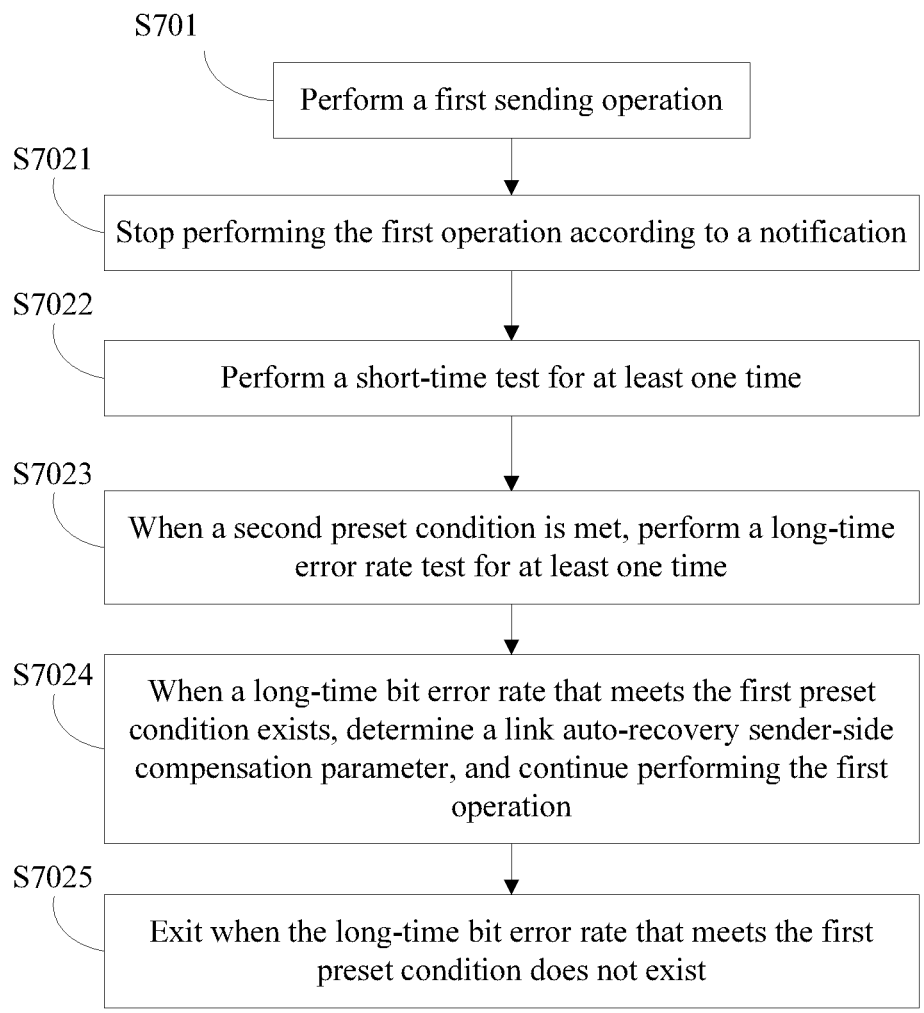
FIG. 8 is another flowchart of a data transmission method based on a sender side according to an embodiment of the present invention.

In other embodiments of the present invention, as shown in FIG. 8, the step S702 may include the following steps:

S7021: Stop performing the first sending operation according to the notification from the upper layer control system and/or the sender side.

S7022: Perform a short-time test for at least one time.

For the sender side, the short-time test may include sending the test code stream based on a sender-side accentuation parameter so that the receiver side receives the test code stream based on a receiver-side compensation parameter and scans a sampling window width, where the short-time test performed each time is based on a different combination of the receiver-side compensation parameter and the sender-side accentuation parameter.

For related detailed contents, see the description given hereinabove, and no repeated description is given here any further.

S7023: When a second preset condition is met, perform a long-time bit error rate test for at least one time.

For the sender side, the long-time bit error rate test performed each time includes sending a test code stream based on the sender-side accentuation parameter corresponding to a short-time test in which a sampling window width value meets a third preset condition, so that the receiver side receives the test code stream based on the receiver-side compensation parameter corresponding to the same short-time test.

For relevant detailed contents, see the description given hereinabove, and no repeated description is given here any further.

S7024: When the receiver side or the upper layer control system determines existence of a long-time bit error rate that meets the first preset condition, determine a link auto-recovery sender-side compensation parameter, and continue performing the first sending operation.

As regards how the link auto-recovery sender-side accentuation parameter is determined, the receiver side may directly notify the sender side to implement the determining, as mentioned hereinabove; or, each EQ parameter combination may be numbered, and the receiver side may notify a sequence number to the sender side, and then the sender side can determine the link auto-recovery sender-side accentuation parameter according to the sequence number. Alternatively, when the EQ parameter combination is allocated by the upper layer control system, the upper layer control system may allocate the link auto-recovery sender-side accentuation parameter to the sender side, and the sender side receives the allocated link auto-recovery sender-side accentuation parameter so that the link auto-recovery sender-side accentuation parameter is determined.

S7025: Exit when the receiver side or the upper layer control system determines no existence of the long-time bit error rate that meets the first preset condition.

In other embodiments of the present invention, after the exit, the data transmission method may further include switching to another normally communicating data link.

As described above, a retry buffer and counters may be used to implement data transmission. The following describes how the sender side uses the retry buffer and the counters to implement data transmission.

The sending non-retransmitted data that is inclusive of a check bit to the receiver side may include, whenever a piece of non-retransmitted data is sent to the receiver side and written as a backup into the retry buffer, adding 1 to wrptr and releasing N+1 spaces in the retry buffer according to a received ACK packet (the ACK packet is sent when Numack jumps from N to 0 on the receiver side).

The sending retransmitted data may include keeping the wrptr unchanged, extracting eseq from the data retransmission request that carries the eseq, using the eseq as rdptr, constructing a packet that is inclusive of a retransmission flag using the data that the rdptr points to as retransmitted data, and sending the packet to the receiver side.

Because the operations on the sender side correspond to the operations on the receiver side, the sender side is not described lengthily herein. See the description given hereinabove.

It should be noted that, although the foregoing method in the present invention uses inter-chip data transmission as an application scenario, in fact, the method is also used for data transmission between two devices/terminals (such as data transmission between mobile phones) or even between two systems. After the method is described, the device and the system provided in the present invention are described below.

Figure 9:
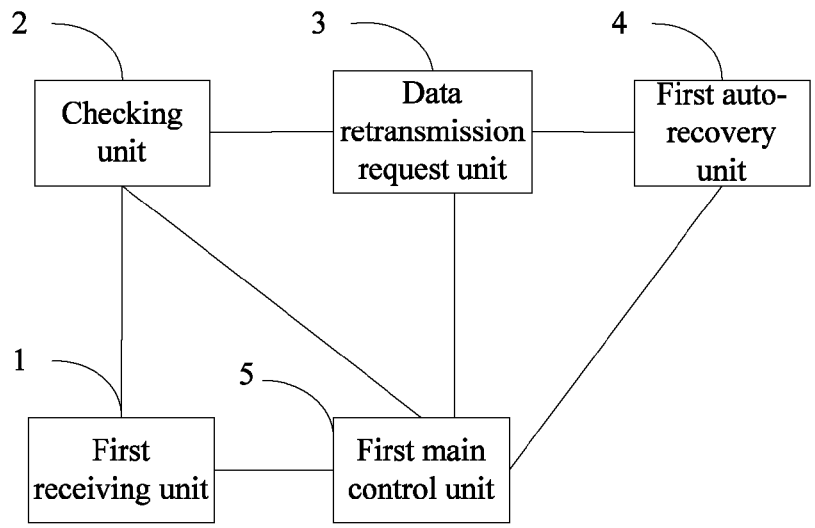
FIG. 9 is a schematic structural diagram of a data transmission device according to an embodiment of the present invention.

Corresponding to the data transmission method on the receiver side, a data transmission device is further provided in the embodiments of the present invention. FIG. 9 shows a structure of the data transmission device. The data transmission device includes a first receiving unit 1, a checking unit 2, a data retransmission request unit 3, a first auto-recovery unit 4, and a first main control unit 5.

The first main control unit 5 is configured to instruct the first receiving unit 1 to perform a first receiving operation, where the first receiving operation includes receiving data sent by a sender side (the data includes retransmitted data or non-retransmitted data that is inclusive of a check bit); instruct the checking unit 2 to check the received data; when the checking unit 2 does not detect erroneous data, instruct the first receiving unit 1 to continue performing the first receiving operation; or, when the checking unit 2 detects erroneous data instruct the data retransmission request unit 3 to discard the erroneous data and subsequently received non-retransmitted data, send a data retransmission request to the sender side, and count an bit error rate; determine whether the counted bit error rate meets a first preset condition, and, if the bit error rate meets the first preset condition, instruct the first receiving unit 1 to continue performing the first receiving operation, or, if the bit error rate does not meet the first preset condition, instruct the first auto-recovery unit 4 to collaborate with the sender side to perform link auto-recovery by transmitting a test code stream based on different compensation parameter combinations; when the link auto-recovery succeeds, instruct the first receiving unit 1 to continue performing the first receiving operation, or, when the link auto-recovery fails, instruct all units to exit. As regards how to determine the success or failure of the link auto-recovery, see the description given hereinabove, and no repeated description is given here any further.

Certainly, the functions of the first main control unit 5 may also be distributed among other units, so that other units can perform operations independently.

Figure 10:
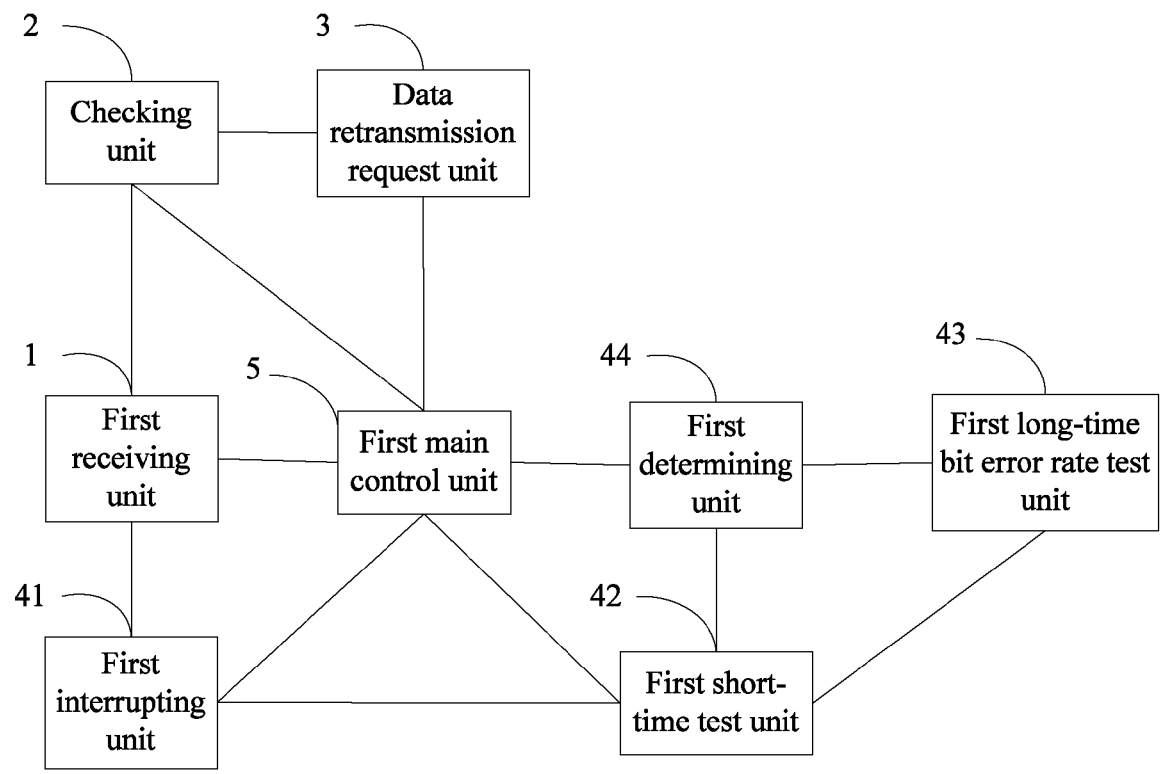
FIG. 10 is another schematic structural diagram of a data transmission device according to an embodiment of the present invention.

In other embodiments of the present invention, as shown in FIG. 10, the first auto-recovery unit 4 may include a first interrupting unit 41, a first short-time test unit 42, a first long-time bit error rate test unit 43, and a first determining unit 44.

The first interrupting unit 41 is configured to instruct the first receiving unit 1 to stop performing the first receiving operation and get interrupted, so that an upper layer control system responds to the interruption and determines a link exception and, by means of the interruption, instructs the sender side of a link to stop sending the data.

The first short-time test unit 42 is configured to perform a short-time test for at least one time. The short-time test includes receiving a test code stream from the sender side based on a receiver-side compensation parameter and scanning a sampling window width, where the test code stream is sent by the sender side based on a sender-side accentuation parameter, and the short-time test performed each time is based on a different combination of the receiver-side compensation parameter and the sender-side accentuation parameter.

The first long-time bit error rate test unit 43 is configured to, when a second preset condition is met, perform a long-time bit error rate test for at least one time and obtain a long-time bit error rate. The long-time bit error rate test performed each time includes receiving, by the receiver side, a test code stream based on the receiver-side compensation parameter corresponding to a short-time test in which a sampling window width value meets a third preset condition, where the test code stream is sent by the sender side based on the sender-side accentuation parameter corresponding to the same short-time test.

The first determining unit 44 is configured to determine whether a long-time bit error rate that meets the first preset condition exists, and, if the long-time bit error rate that meets the first preset condition exists, determine a link auto-recovery receiver-side compensation parameter, adjust a sampling point to a central position of a sampling window, and notify the first main control unit 5 of an auto-recovery success, or, if the long-time bit error rate that meets the first preset condition does not exist, notify the first main control unit 5 of an auto-recovery failure.

Certainly, the first determining unit 44 may also be configured only to determine the link auto-recovery receiver-side compensation parameter, and adjust the sampling point to the central position of the sampling window. In this case, the first main control unit 5 may determine whether the long-time bit error rate that meets the first preset condition exists, and, if the long-time bit error rate that meets the first preset condition does not exist, the first main control unit 5 draws a conclusion of an auto-recovery failure, and instructs all units to exit, or, if the long-time bit error rate that meets the first preset condition exists, the first main control unit 5 instructs the first determining unit 44 to determine the link auto-recovery receiver-side compensation parameter, and adjust the sampling point to the central position of the sampling window.

The link auto-recovery receiver-side compensation parameter corresponds to a link auto-recovery sender-side accentuation parameter on the sender side, and the link auto-recovery receiver-side compensation parameter and the link auto-recovery sender-side accentuation parameter are respectively the receiver-side compensation parameter and the sender-side accentuation parameter used in the same long-time bit error rate test in which the long-time bit error rate meets the first preset condition.

Figure 11:
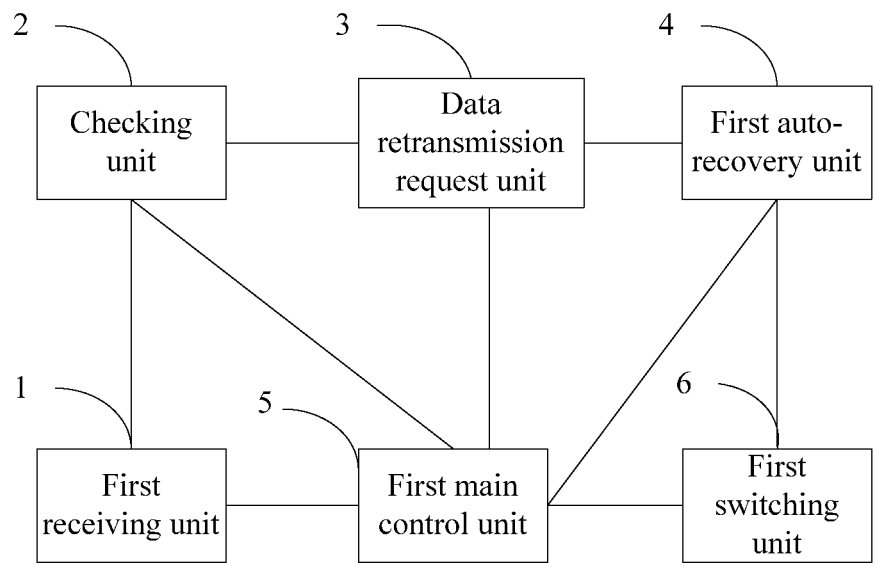
FIG. 11 is still another schematic structural diagram of a data transmission device according to an embodiment of the present invention.

In other embodiments of the present invention, as shown in FIG. 11, the data transmission device may further include a first switching unit 6 configured to switch to another normally communicating data link after all units exit.

The device shown in FIG. 9-11 corresponds to the data transmission method on the sender side. Therefore, for more detailed descriptions, see the description given hereinabove, and no repeated description is given here any further.

Figure 12:
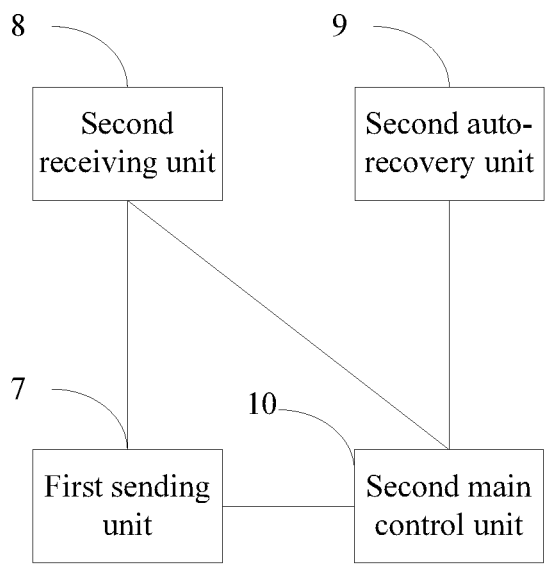
FIG. 12 is still another schematic structural diagram of a data transmission device according to an embodiment of the present invention.

Corresponding to the data transmission method on the sender side, a data transmission device is further provided in the embodiments of the present invention. FIG. 12 shows a structure of the data transmission device. The data transmission device includes a first sending unit 7, a second receiving unit 8, a second auto-recovery unit 9, and a second main control unit 10.

The second main control unit 10 is configured to instruct the first sending unit 7 to perform a first sending operation; when receiving a data sending stop notification from an upper layer control system and/or a sender side, instruct the second auto-recovery unit 9 to collaborate with a receiver side to perform link auto-recovery by transmitting a test code stream based on different compensation parameter combinations; and when the auto-recovery succeeds, instruct the first sending unit 7 to continue performing the first sending operation, or, when the auto-recovery fails, instruct all units to exit. As regards how to determine the success or failure of the link auto-recovery, see the description given hereinabove, and no repeated description is given here any further.

The first sending operation includes sending non-retransmitted data that is inclusive of a check bit to the receiver side when no data retransmission request is received (by the second receiving unit 8), and sending retransmitted data when the data retransmission request is received (by the second receiving unit 8) and no data sending stop notification is received from the upper layer control system and/or the sender side.

The data retransmission request is sent by the receiver side when receiving of erroneous data is detected, the notification is sent when the receiver side detects the receiving of the erroneous data and determines that an bit error rate does not meet a first preset condition, the bit error rate is counted when the receiver side detects the receiving of the erroneous data and discards the erroneous data and subsequently received non-retransmitted data, and the first preset condition is that the bit error rate is less than a preset bit error rate threshold.

Figure 13:
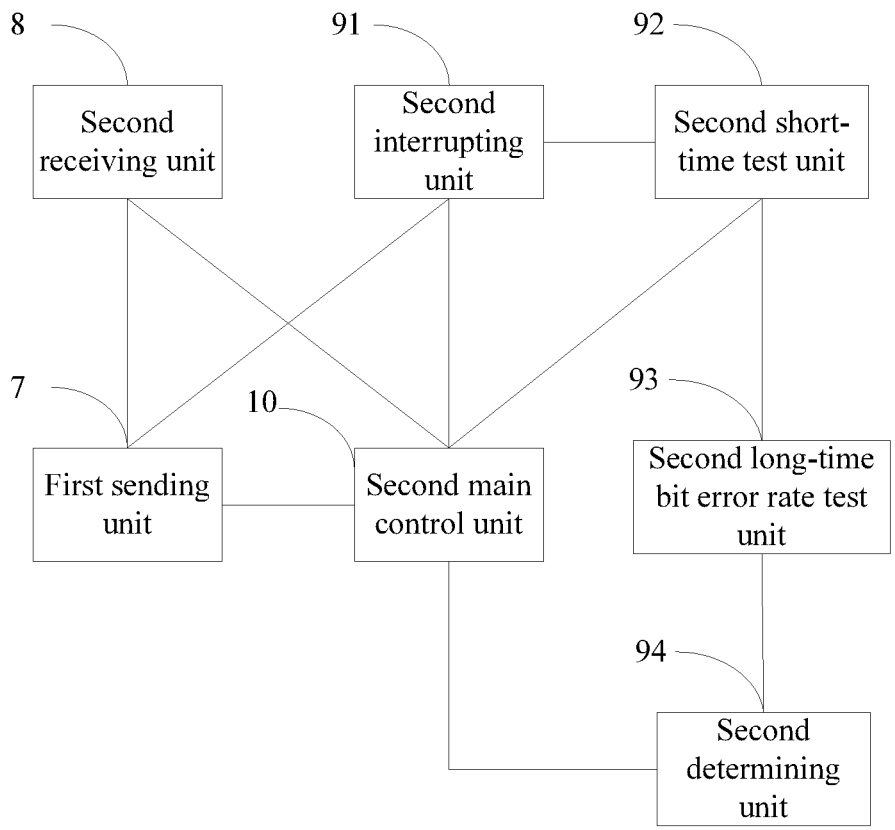
FIG. 13 is still another schematic structural diagram of a data transmission device according to an embodiment of the present invention.

In other embodiments of the present invention, as shown in FIG. 13, the second auto-recovery unit 9 may include a second interrupting unit 91, a second short-time test unit 92, a second long-time bit error rate test unit 93, and a second determining unit 94.

The second interrupting unit 91 is configured to instruct the first sending unit 7 to stop performing the first sending operation.

The second short-time test unit 92 is configured to perform a short-time test for at least one time, where the short-time test includes sending the test code stream based on a sender-side accentuation parameter so that the receiver side receives the test code stream based on a receiver-side compensation parameter and scans a sampling window width, where the short-time test performed each time is based on a different combination of the receiver-side compensation parameter and the sender-side accentuation parameter.

The second long-time bit error rate test unit 93 is configured to, when a second preset condition is met, perform a long-time bit error rate test for at least one time, where the long-time bit error rate test performed each time includes sending a test code stream based on the sender-side accentuation parameter corresponding to a short-time test in which a sampling window width value complies with a third preset condition, so that the receiver side receives the test code stream based on the receiver-side compensation parameter corresponding to the same short-time test.

The second determining unit 94 is configured to determine a link auto-recovery sender-side compensation parameter when the receiver side or the upper layer control system determines existence of a long-time bit error rate that meets the first preset condition.

The link auto-recovery sender-side compensation parameter corresponds to a link auto-recovery receiver-side accentuation parameter on the receiver side, and the link auto-recovery sender-side compensation parameter and the link auto-recovery receiver-side accentuation parameter are respectively a sender-side compensation parameter and a receiver-side accentuation parameter used in a same long-time bit error rate test in which the long-time bit error rate meets the first preset condition.

In this embodiment of the present invention, when determining existence of the long-time bit error rate that meets the first preset condition, the receiver side or the upper layer control system may send an auto-recovery instruction to the sender side (the second receiving unit 8 may be further configured to receive the auto-recovery instruction), so as to indicate whether the auto-recovery succeeds.

The second main control unit 10 may, according to the auto-recovery instruction, instruct all units to exit or instruct the second determining unit 9 to work.

In addition, if the auto-recovery succeeds, the auto-recovery instruction may further include a link auto-recovery sender-side compensation parameter, and therefore, the second determining unit 9 can determine the link auto-recovery sender-side compensation parameter according to the auto-recovery instruction.

Certainly, if the auto-recovery succeeds, the receiver side or the upper layer control system may further send information that is inclusive of the link auto-recovery sender-side compensation parameter to the second receiving unit 8 after sending the auto-recovery instruction, which is not detailed here any further.

Figure 14:
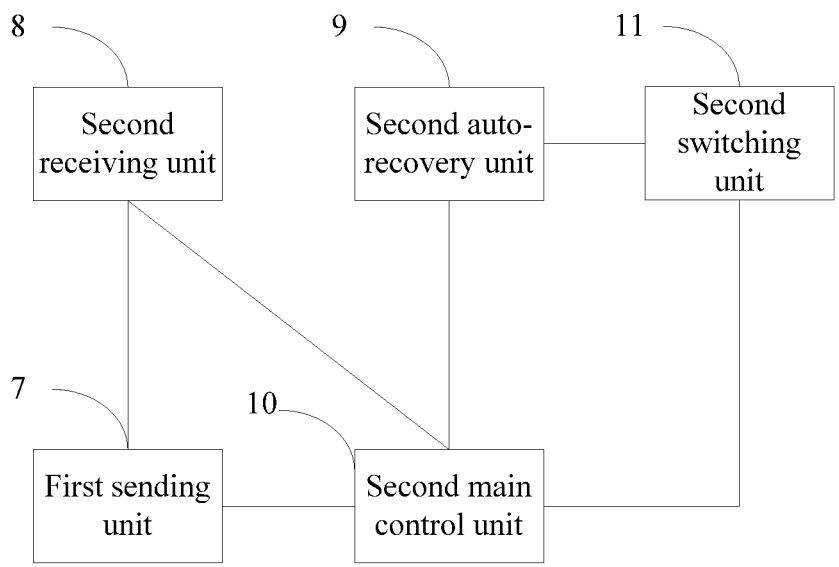
FIG. 14 is still another schematic structural diagram of a data transmission device according to an embodiment of the present invention.

In other embodiments of the present invention, as shown in FIG. 14, the data transmission device may further include a second switching unit 11 configured to switch to another normally communicating data link after all units exit.

The device shown in FIG. 12-14 corresponds to the data transmission method on the sender side. Therefore, for more detailed descriptions, see the description given hereinabove, and no repeated description is given here any further.

Figure 15A:
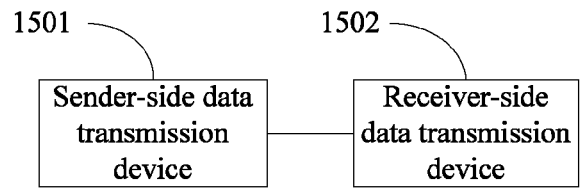
FIG. 15A and FIG. 15B are schematic structural diagrams of a data transmission system according to an embodiment of the present invention.
Figure 15B:
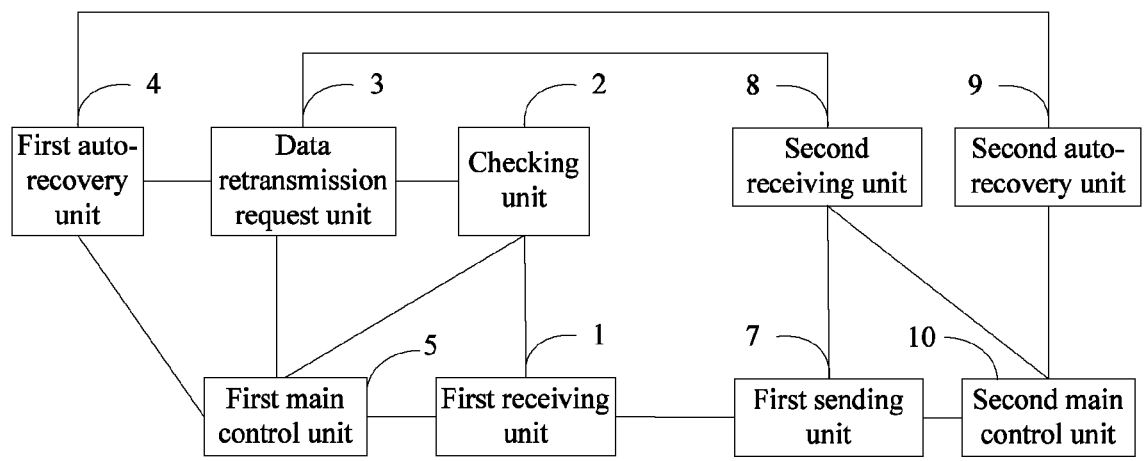

Other embodiments of the present invention further disclose a data transmission system. As shown in FIGS. 15A and 15B, the data transmission system includes a sender-side data transmission device 1501 and a receiver-side data transmission device 1502, where the sender-side data transmission device 1501 may include units illustrated in FIG. 12-14, and the receiver-side data transmission device 1502 may include units illustrated in FIG. 9-11.

Figure 16A:
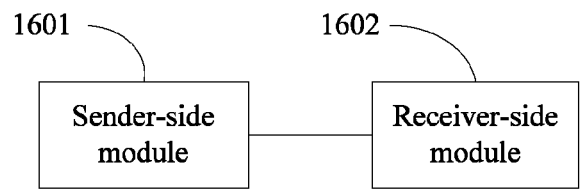
FIG. 16A is another schematic structural diagram of a data transmission device according to an embodiment of the present invention.

Considering that some devices (such as mobile phones) may serve as both a sender side and a receiver side, the embodiments of the present invention further provide a data transmission device serving as both a sender side and a receiver side. A structure of the data transmission device is shown in FIG. 16A, and the data transmission device includes a sender-side module 1601 and a receiver-side module 1602. In addition, the sender-side module 1601 includes at least the units illustrated in FIG. 12-14, and the receiver-side module 1602 includes at least the units illustrated in FIG. 9-11.

Figure 16B:
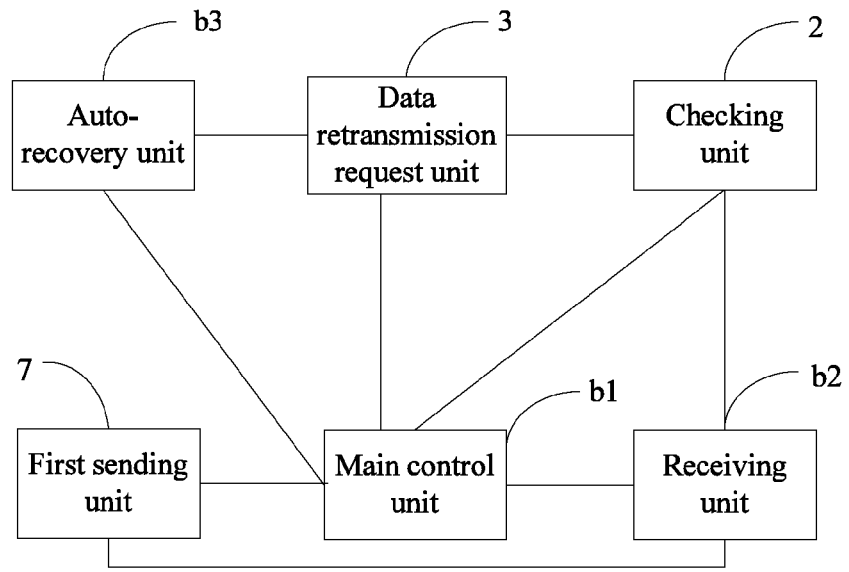
FIG. 16B is another schematic structural diagram of a data transmission device according to an embodiment of the present invention.

In addition, as shown in FIG. 16B, the first main control unit and the second main control unit may combine into a main control unit b1, the first receiving unit and the second receiving unit may combine into a receiving unit b2, and the first auto-recovery unit and the second auto-recovery unit may combine into an auto-recovery unit b3.

Corresponding to the foregoing data transmission device serving as both a sender side and a receiver side, a data transmission system is further provided in this embodiment of the present invention. The system includes at least one data transmission device shown in FIG. 16A or 16B.

In addition, it should be noted that, in other embodiments of the present invention, all (or part) of the functions of the sender-side device, the sender-side data transmission device 1501, or the sender-side module 1601 may be implemented by an application specific integrated circuit (ASIC), a field programmable gate array (FPGA), and the like. Certainly, all (or part) of the functions of the receiver-side device, the receiver-side data transmission device 1502, or the receiver-side module 1602 may be implemented by an ASIC, an FPGA, and the like.

Figure 17:
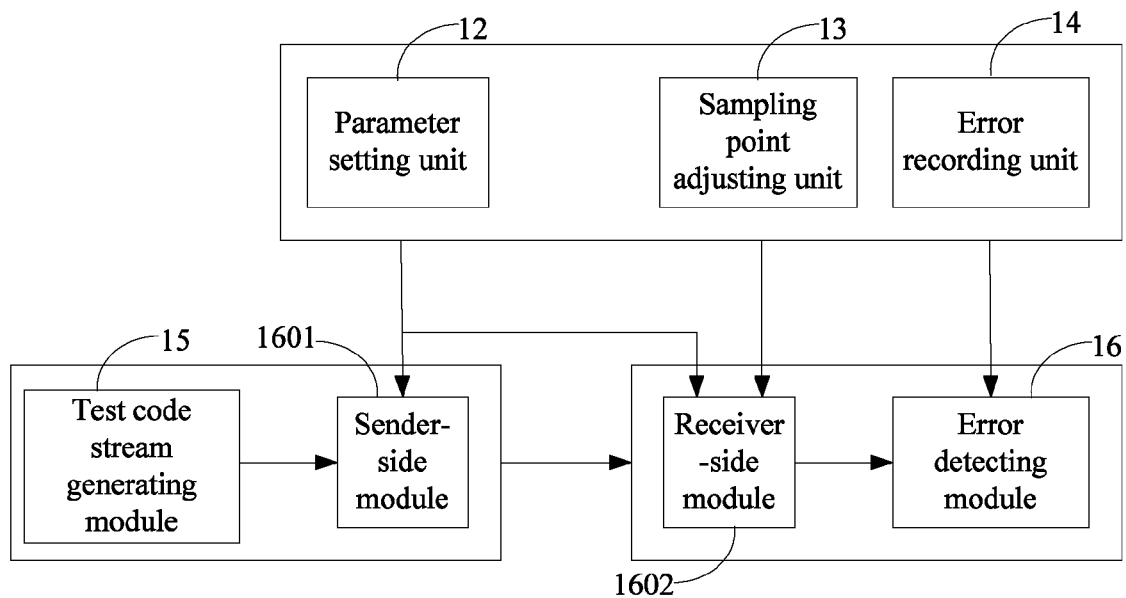
FIG. 17 is a schematic diagram of sampling window width scanning according to an embodiment of the present invention.

Using the ASIC as an example, as shown in FIG. 17, the upper layer control system may include a parameter setting unit 12, a sampling point adjusting unit 13, and an error recording unit 14. The ASIC serving as a sender side may further include a test code stream generating unit 15 (to generate a test code stream), and the ASIC serving as a receiver side may further include an error detecting unit 16. When a sampling window width is scanned, the sampling point adjusting unit 13 sets a sampling point position on the receiver side. When error detection is performed on each sampling point, the error detecting unit 16 is cleared to 0 after a steady state is reached (the steady state is determined according to time, and the steady state is meant to come after expiry of 1s), whereupon timing begins. After the test continues for a preset duration (such as 1s), the number of errors of the error detecting unit 16 is read. The number of continuous sampling points with zero errors is the sampling window width.

Certainly, the functions of the parameter setting unit 12, the sampling point adjusting unit 13, and the error recording unit 14 may also be integrated into an ASIC on the receiver side, which is not detailed here any further.

The embodiments in this specification are all described in a progressive manner. Each embodiment emphasizes differences between other embodiments, and, for a same or similar part between the embodiments, mutual reference may be made between the embodiments.

In connection with the embodiments disclosed in this specification, method or algorithm steps may be directly implemented by hardware, a software module executed by a processor, or a combination thereof. The software module may reside in a random access memory (RAM), a memory, a read-only memory (ROM), an electrically programmable ROM (EPROM), an electrically erasable programmable ROM (EEPROM), a register, a hard disk, a removable disk, a compact disk ROM (CD-ROM), or any other form of storage medium known in the art.

The foregoing descriptions about the disclosed embodiments enable a person skilled in the art to implement or use the present invention. Various modifications to the embodiments are apparent to the person skilled in the art, and general principles defined in this specification can be implemented in other embodiments without departing from the spirit or scope of the present invention. Therefore, the present invention is not limited to the exemplary embodiments given in this specification, but meets the widest scope that matches the principles and novel features disclosed in this specification.

What is claimed is:

1. A data transmission method, wherein the method is used to exchange data with a sender side, and the method comprises:
    receiving data sent by the sender side;
    checking the received data to determine whether erroneous data is detected;
    determining the erroneous data is detected;
    discarding the erroneous data and subsequently received non-retransmitted data;
    sending a data retransmission request to the sender side;
    counting a bit error rate of retransmitted data from the sender side;
    determining the bit error rate is not less than a preset bit error rate threshold; and
    collaborating with the sender side to perform link auto-recovery by transmitting a test code stream based on different compensation parameter combinations,
    wherein the compensation parameter combinations comprise a receiver-side compensation parameter and a sender-side accentuation parameter,
    wherein the link auto-recovery success is determined according to existence of a compensation parameter combination in which a bit error rate of transmitting the test code stream is less than the preset bit error rate threshold, and
    wherein the link auto-recovery failure is determined according to no existence of the compensation parameter combination in which the bit error rate of transmitting the test code stream is less than the preset bit error rate threshold.

2. The method according to claim 1, wherein the step of collaborating with the sender side to perform link auto-recovery by transmitting the test code stream based on different compensation parameter combinations comprises:

stopping, by a receiver side, receiving data and getting into interrupt so that an upper layer control system responds to the interrupt and instructs the sender side to stop sending data;

performing a short-time test for at least one time, wherein the short-time test comprises receiving the test code stream based on the receiver-side compensation parameter and scanning a sampling window width, wherein the test code stream is sent by the sender side based on the sender-side accentuation parameter, and the short-time test performed each time is based on a different combination of the receiver-side compensation parameter and the sender-side accentuation parameter;

performing a long-time bit error rate test to obtain a long-time bit error rate for at least one time, wherein the long-time bit error rate test performed each time comprises receiving, by the receiver side, a test code stream based on the receiver-side compensation parameter corresponding to the short-time test in which the sampling window width is greater than a preset width value, and the test code stream is sent by the sender side based on the sender-side accentuation parameter corresponding to the same short-time test;

determining the long-time bit error rate is less than the preset bit error rate threshold;

taking the receiver-side compensation parameter used in the long-time bit error rate test as a link auto-recovery receiver-side compensation parameter;

adjusting a sampling point to a central position of a sampling window; and starting receiving data from the sender side, wherein the link auto-recovery receiver-side compensation parameter corresponds to a link auto-recovery sender-side accentuation parameter, and wherein the link auto-recovery receiver-side compensation parameter and the link auto-recovery sender-side accentuation parameter are respectively the receiver-side compensation parameter and the sender-side accentuation parameter which are used in the long-time bit error rate test.

3. The method according to claim 2, wherein the long-time bit error rate test is performed after determining a short-time bit error rate in the short-time test is less than the preset bit error rate threshold.

4. The method according to claim 2, wherein the receiver-side compensation parameter and the sender-side accentuation parameter used in the same long-time bit error rate test in which the long-time bit error rate is less than the preset bit error rate threshold comprise the receiver-side compensation parameter and the sender-side accentuation parameter used in the same long-time bit error rate test in which the long-time bit error rate is less than the preset bit error rate threshold, and in which the sampling window width value is the greatest.

5. The method according to claim 2, wherein scanning the sampling window width comprises:
performing an error check on each sampling point; and
using the number of continuous sampling points with zero errors as the sampling window width.

6. The method according to claim 1, wherein the method further comprises:
switching to another normally communicating data link when the link auto-recovery fails.

7. The method according to claim 1, wherein at least a retry buffer and a second counter are set on the sender side, wherein a fifth counter and a sixth counter are set on the receiver side, wherein a depth of the retry buffer is M, wherein the fifth counter counts from 0 to M−1 cyclically and incrementally, wherein the sixth counter counts from 0 to N cyclically and incrementally, wherein the N is a positive integer, wherein current count values in the second counter, the fifth counter, and the sixth counter are denoted by rdptr, eseq, and Numack respectively, and wherein determining the erroneous data is detected, discarding the erroneous data and subsequently received non-retransmitted data, sending a data retransmission request to the sender side, and counting a bit error rate comprises:

checking received data, to determining the erroneous data is received;

discarding the erroneous data and the subsequently received non-retransmitted data;

sending a data retransmission request that carries the eseq to the sender side, so that the sender side extracts the eseq, uses the eseq as the rdptr, sends, to the receiver side, the data that the rdptr points to as retransmitted data; and counting the bit error rate of the retransmitted data.

8. A data transmission method, wherein the method is used to exchange data with a receiver side, and the method comprising:

sending data to the receiver side;

receiving a data sending stop notification from an upper layer control system or a receiver side when erroneous data is detected on the receiver side and a bit error rate of retransmitted data is not less than a preset bit error rate threshold;

collaborating with the receiver side to perform link auto-recovery by transmitting a test code stream based on different compensation parameter combinations, wherein the compensation parameter combinations comprise a receiver-side compensation parameter and a sender-side accentuation parameter;

continuing sending data to the receiver side when the link auto-recovery succeeds; and exiting when the link auto-recovery fails;

wherein the link auto-recovery success is determined according to existence of a compensation parameter combination in which a bit error rate of transmitting the test code stream is less than the preset bit error rate threshold, and wherein the link auto-recovery failure is determined according to no existence of the compensation parameter combination in which the bit error rate of transmitting the test code stream is less than the preset bit error rate threshold.

9. The method according to claim 8, wherein the collaborating with the receiver side to perform link auto-recovery comprises:

stopping sending data to the receiver side according to the notification;

performing a short-time test for at least one time, wherein the short-time test comprises sending the test code stream based on the sender-side accentuation parameter so that the receiver side receives the test code stream based on the receiver-side compensation parameter and scans a sampling window width, and the short-time test performed each time is based on a different combination of the receiver-side compensation parameter and the sender-side accentuation parameter;

performing a long-time bit error rate test for at least one time, wherein the long-time bit error rate test performed each time comprises sending a test code stream based on the sender-side accentuation parameter corresponding to the short-time test in which the sampling window width value is greater than a preset width value, so that the receiver side receives the test code stream based on the receiver-side compensation parameter corresponding to the same short-time test;

taking a sender-side compensation parameter used in the long-time bit error rate test as a link auto-recovery sender-side compensation parameter when the receiver side or the upper layer control system determines a long-time bit error rate of the long-time bit error rate test is less than the preset bit error rate threshold;

continuing sending data to the receiver side; and wherein the link auto-recovery sender-side compensation parameter corresponds to a link auto-recovery receiver-side accentuation parameter, and the link auto-recovery sender-side compensation parameter and the link auto-recovery receiver-side accentuation parameter are respectively the sender-side compensation parameter and the receiver-side accentuation parameter which are used in the long-time bit error rate test.

10. The method according to claim 8, wherein, the method further comprises:

switching to another normally communicating data link when the link auto-recovery fails.

11. The method according to claim 8, wherein at least a retry buffer, a first counter, and a second counter are set on the sender side, wherein a fifth counter and a sixth counter are set on the receiver side, wherein a depth of the retry buffer is M, wherein the first counter counts from 0 to M−1 cyclically and incrementally, wherein the fifth counter counts from 0 to M−1 cyclically and incrementally, wherein the fifth counter increases by 1 whenever a piece of errorless data or a retransmitted packet is received, wherein the sixth counter counts from 0 to N cyclically and incrementally, wherein the sixth counter increases by 1 whenever a piece of errorless data is received, wherein the N is a positive integer, wherein current values in the first counter, the second counter, the fifth counter, and the sixth counter are denoted by wrptr, rdptr, eseq, and Numack respectively, wherein the sending non-retransmitted data that is inclusive of a check bit to the receiver side comprises: whenever a piece of non-retransmitted data is sent to the receiver side and written as a backup into the retry buffer, adding 1 to the wrptr and releasing N+1 spaces in the retry buffer according to a received ACK packet, wherein the ACK packet is sent when the Numack jumps from N to 0 on the receiver side; and wherein the sending retransmitted data comprises: keeping the wrptr unchanged; extracting the eseq from the data retransmission request that carries the eseq; using the eseq as the rdptr; and sending, to the receiver side, the data that the rdptr points to as retransmitted data.

12. A data transmission device, wherein the data transmission device is used to exchange data with a sender side, and wherein the data transmission device comprises a first receiving unit, a checking unit, a data retransmission request unit, a first auto-recovery unit, and a first main control unit, wherein:

the first receiving unit is configured to receiving data sent by the sender side, and wherein the data comprises retransmitted data or non-retransmitted data that is inclusive of a check bit;

the checking unit is configured to check the received data to determine whether erroneous data is detected;

the data retransmission request unit is configured to discard the erroneous data and subsequently receive non-retransmitted data when the erroneous data is detected, send a data retransmission request to the sender side, and count a bit error rate of retransmitted data from the sender side;

the first main control unit is configured to determine the bit error rate is not less than a preset bit error rate threshold and control the first auto-recovery unit to collaborate with the sender-side for link auto-recovery;

the first auto-recovery unit is configured to collaborate with the sender side to perform link auto-recovery by transmitting a test code stream based on different compensation parameter combinations, wherein the compensation parameter combinations comprise a receiver-side compensation parameter and a sender-side accentuation parameter; and the first auto-recovery unit is configured to determine the link auto-recovery is successful when a compensation parameter combination, in which a bit error rate of transmitting the test code stream is less than the preset bit error rate threshold, exists; and the first auto-recovery unit is configured to determine the link auto-recovery has failed when a compensation parameter combination, in which a bit error rate of transmitting the test code stream is less than the preset bit error rate threshold, does not exist.

13. The device according to claim 12, wherein the first auto-recovery unit comprises a first interrupting unit, a first short-time test unit, a first long-time bit error rate test unit, and a first determining unit, wherein:

the first interrupting unit is configured to instruct the first receiving unit to stop receiving data sent by the sender side and get into interrupt, so that an upper layer control system responds to the interrupt and instructs the sender side to stop sending the data;

the first short-time test unit is configured to perform a short-time test for at least one time, wherein the short-time test comprises receiving a test code stream from the sender side based on the receiver-side compensation parameter and scanning a sampling window width, wherein the test code stream is sent by the sender side based on the sender-side accentuation parameter, and the short-time test performed each time is based on a different combination of the receiver-side compensation parameter and the sender-side accentuation parameter;

the first long-time bit error rate test unit is configured to perform a long-time bit error rate test for at least one time to obtain a long-time bit error rate, wherein the long-time bit error rate test performed each time comprises receiving, by the receiver side, a test code stream based on the receiver-side compensation parameter corresponding to a short-time test in which a sampling window width value is greater than the preset width value, wherein the test code stream is sent by the sender side based on the sender-side accentuation parameter corresponding to the same short-time test;

the first determining unit is configured to determine a link auto-recovery receiver-side compensation parameter when a long-time bit error rate that is less than the preset bit error rate threshold, and adjust a sampling point to a central position of a sampling window;

the link auto-recovery receiver-side compensation parameter corresponds to a link auto-recovery sender-side accentuation parameter, and wherein the link auto-recovery receiver-side compensation parameter and the link auto-recovery sender-side accentuation parameter are respectively the receiver-side compensation parameter and the sender-side accentuation parameter which are used in the same long-time bit error rate test in which the long-time bit error rate is less than the preset bit error rate threshold.

14. The device according to claim 12, further comprising a first switching unit configured to switch to another normally communicating data link when the link auto-recovery fails.

15. A data transmission device, wherein the data transmission device is used to exchange data with a receiver side, wherein the data transmission device comprises a first sending unit, a second receiving unit, a second auto-recovery unit, and a second main control unit, and wherein:
the first sending unit is configured send data to the receiver side;
the second receiving unit is configured to receiving a data sending stop notification from an upper layer control system or a receiver side when erroneous data is detected on the receiver side and a bit error rate of retransmitted data is not less than a preset bit error rate threshold;
the second auto-recovery unit is configured to collaborate with the receiver side to perform link auto-recovery by transmitting a test code stream based on different compensation parameter combinations, wherein the compensation parameter combinations comprise a receiver-side compensation parameter and a sender-side accentuation parameter;
the first sending unit is configured to continue sending data to the receiver side when the link auto-recovery succeeds; and
the first sending unit is configured to instruct all units to exit when the link auto-recovery fails;
wherein the link auto-recovery success is determined according to existence of a compensation parameter combination in which a bit error rate of transmitting the test code stream is less than the preset bit error rate threshold, and
wherein the link auto-recovery failure is determined according to no existence of the compensation parameter combination in which the bit error rate of transmitting the test code stream is less than the preset bit error rate threshold.

16. The device according to claim 15, wherein the second auto-recovery unit comprises a second interrupting unit, a second short-time test unit, a second long-time bit error rate test unit, and a second determining unit, wherein:
the second interrupting unit is configured to instruct the first sending unit to stop sending data to the receiver side;
the second short-time test unit is configured to perform a short-time test for at least one time, wherein the short-time test comprises sending the test code stream based on the sender-side accentuation parameter so that the receiver side receives the test code stream based on the receiver-side compensation parameter and scans a sampling window width, wherein the short-time test performed each time is based on a different combination of the receiver-side compensation parameter and the sender-side accentuation parameter;
the second long-time test unit is configured to perform a long-time bit error rate test for at least one time to obtain a long-time bit error rate, wherein the long-time bit error rate test performed each time comprises sending a test code stream based on the sender-side accentuation parameter corresponding to the short-time test in which the sampling window width value is greater than a preset width value, so that the receiver side receives the test code stream based on the receiver-side compensation parameter corresponding to the same short-time test;
the second determining unit is configured to take a sender-side compensation parameter used in the long-time bit error rate test as a link auto-recovery sender-side compensation parameter when the receiver side or the upper layer control system determines a long-time bit error rate of the long-time bit error rate test is less than the preset bit error rate threshold; wherein the link auto-recovery sender-side compensation parameter corresponds to a link auto-recovery receiver-side accentuation parameter, and the link auto-recovery sender-side compensation parameter and the link auto-recovery receiver-side accentuation parameter are respectively the sender-side compensation parameter and the receiver-side accentuation parameter which are used in the long-time bit error rate test.

17. The device according to claim 15, further comprising a second switching unit configured to switch to another normally communicating data link when the link auto-recovery fails.

18. A data transmission system comprising a sender-side data transmission device and a receiver-side data transmission device, wherein the receiver-side data transmission device comprises a first receiving unit, a checking unit, a data retransmission request unit, a first auto-recovery unit, and a first main control unit, the sender-side data transmission device comprises a first sending unit, a second receiving unit, a second auto-recovery unit, and a second main control unit, wherein:
the first sending unit is configured to send data to the receiver-side data transmission device, and wherein the data comprises retransmitted data or non-retransmitted data that is inclusive of a check bit;
the first receiving unit is configured to receiving data from the sender-side data transmission device;
the checking unit is configured to check the received data to determine whether erroneous data is detected;
the data retransmission request unit is configured to discard the erroneous data and subsequently receive non-retransmitted data when the erroneous data is detected, send a data retransmission request to the sender-side data transmission device, and count a bit error rate of retransmitted data from the sender side;
the first main control unit is configured to determine the bit error rate is not less than a preset bit error rate threshold, and control the first auto-recovery unit to collaborate with the second auto-recovery unit for link auto-recovery;
the first auto-recovery unit and the second auto-recovery unit are configured to collaborate with each other to perform link auto-recovery by transmitting a test code stream based on different compensation parameter combinations, wherein the compensation parameter combinations comprise a receiver-side compensation parameter and a sender-side accentuation parameter;
the first sending unit is configured to continue sending data to the receiver side when the link auto-recovery succeeds; and
the first sending unit is configured to instruct all units to exit when the link auto-recovery fails;
wherein the link auto-recovery success is determined according to existence of a compensation parameter combination in which a bit error rate of transmitting the test code stream is less than the preset bit error rate threshold, and
wherein the link auto-recovery failure is determined according to no existence of the compensation parameter combination in which the bit error rate of transmitting the test code stream is less than the preset bit error rate threshold.

* * * * *

UNITED STATES PATENT AND TRADEMARK OFFICE
CERTIFICATE OF CORRECTION

PATENT NO. : 9,148,264 B2  
APPLICATION NO. : 14/502326  
DATED : September 29, 2015  
INVENTOR(S) : Xinyu Hou et al.

Page 1 of 1

It is certified that error appears in the above-identified patent and that said Letters Patent is hereby corrected as shown below:

Title Page, Item (30) Foreign Application Priority Data should read:

Apr. 11, 2012  (CN) ....................201210104821.0

Signed and Sealed this  
Twenty-third Day of February, 2016

Michelle K. Lee  
*Director of the United States Patent and Trademark Office*